(12) United States Patent
Cargill et al.

(10) Patent No.: US 11,375,866 B2
(45) Date of Patent: Jul. 5, 2022

(54) CONTROL OF EVACUATION STATIONS

(71) Applicant: iRobot Corporation, Bedford, MA (US)

(72) Inventors: Ellen B. Cargill, Norfolk, MA (US); Douglas Dell'Accio, Boston, MA (US); Benjamin Pheil, Ontario, NY (US); Flavia Pastore, Wakefield, MA (US); Paul Schmitt, Merrimack, NH (US); John P. O'Brien, Newton, MA (US)

(73) Assignee: iRobot Corporation, Bedford, MA (US)

(*) Notice: Subject to any disclaimer, the term of this patent is extended or adjusted under 35 U.S.C. 154(b) by 0 days.

(21) Appl. No.: 17/320,484

(22) Filed: May 14, 2021

(65) Prior Publication Data

US 2021/0321852 A1 Oct. 21, 2021

Related U.S. Application Data

(63) Continuation of application No. 16/555,483, filed on Aug. 29, 2019, now Pat. No. 11,006,806.
(Continued)

(51) Int. Cl.
*A47L 11/40* (2006.01)
*B01D 46/44* (2006.01)
(Continued)

(52) U.S. Cl.
CPC ...... *A47L 11/4025* (2013.01); *B01D 46/0086* (2013.01); *B01D 46/02* (2013.01);
(Continued)

(58) Field of Classification Search
CPC ........... A47L 2201/024; A47L 11/4025; B01D 46/446; B01D 46/0086
See application file for complete search history.

(56) References Cited

U.S. PATENT DOCUMENTS

| 4,388,825 A | 6/1983 | Devalpillieres |
| 8,572,799 B2 | 11/2013 | Won et al. |

(Continued)

FOREIGN PATENT DOCUMENTS

| CN | 102334943 | 2/2012 |
| CN | 102891488 | 1/2013 |

(Continued)

OTHER PUBLICATIONS

"U.S. Appl. No. 16/555,483, Corrected Notice of Allowability dated Apr. 7, 2021", 4 pgs.

(Continued)

*Primary Examiner* — Jason K Niesz
(74) *Attorney, Agent, or Firm* — Schwegman Lundberg & Woessner, P.A.

(57) ABSTRACT

An evacuation station for collecting debris from a cleaning robot includes a controller configured to execute instructions to perform one or more operations. The one or more operations includes initiating an evacuation operation such that an air mover draws air containing debris from the cleaning robot, through an intake of the evacuation station, and through a canister of the evacuation station and such that a receptacle received by the evacuation station receives at least a portion of the debris drawn from the cleaning robot. The one or more operations includes ceasing the evacuation operation in response to a pressure value being within a range. The pressure value is determined based at least in part on data indicative of an air pressure, and the range is set based at least in part on a number of evacuation operations initiated before the evacuation operation.

20 Claims, 20 Drawing Sheets

Related U.S. Application Data

(60) Provisional application No. 62/724,792, filed on Aug. 30, 2018.

(51) Int. Cl.
  *B01D 46/02* (2006.01)
  *G05D 7/06* (2006.01)
  *B01D 46/00* (2022.01)

(52) U.S. Cl.
  CPC ......... *B01D 46/446* (2013.01); *G05D 7/0676* (2013.01); *A47L 2201/024* (2013.01); *B01D 2279/55* (2013.01)

(56) References Cited

U.S. PATENT DOCUMENTS

| | | | |
|---|---|---|---|
| 8,639,389 B2 | 1/2014 | Vukojevic et al. | |
| 8,956,421 B2 | 2/2015 | Streeter et al. | |
| 8,984,708 B2 | 3/2015 | Kuhe et al. | |
| 9,462,920 B1 | 10/2016 | Morin et al. | |
| 9,492,048 B2 | 11/2016 | Won et al. | |
| 9,788,698 B2 | 10/2017 | Morin et al. | |
| 9,888,818 B2 | 2/2018 | Kuhe et al. | |
| 9,924,846 B2 | 3/2018 | Morin et al. | |
| 9,931,007 B2 | 4/2018 | Morin et al. | |
| 9,955,841 B2 | 5/2018 | Won et al. | |
| 10,154,768 B2 | 12/2018 | Morin et al. | |
| 10,463,215 B2 * | 11/2019 | Morin | A47L 9/1436 |
| 11,006,806 B2 | 5/2021 | Cargill et al. | |
| 2006/0032298 A1 | 2/2006 | Ciesielka et al. | |
| 2009/0044370 A1 | 2/2009 | Won et al. | |
| 2010/0011529 A1 | 1/2010 | Won et al. | |
| 2010/0107355 A1 | 5/2010 | Won et al. | |
| 2012/0084937 A1 | 4/2012 | Won et al. | |
| 2012/0291809 A1 | 11/2012 | Kuhe et al. | |
| 2014/0109339 A1 | 4/2014 | Won et al. | |
| 2014/0130272 A1 | 5/2014 | Won et al. | |
| 2014/0281779 A1 | 9/2014 | Wellman et al. | |
| 2015/0223651 A1 | 8/2015 | Kuhe et al. | |
| 2016/0166126 A1 | 6/2016 | Morin et al. | |
| 2016/0183752 A1 | 6/2016 | Morin et al. | |
| 2016/0374528 A1 | 12/2016 | Morin et al. | |
| 2017/0055796 A1 | 3/2017 | Won et al. | |
| 2018/0008111 A1 | 1/2018 | Morin et al. | |
| 2018/0125312 A1 | 5/2018 | Kuhe et al. | |
| 2018/0177369 A1 | 6/2018 | Morin et al. | |
| 2018/0235424 A1 * | 8/2018 | Morin | A47L 11/4025 |
| 2019/0133399 A1 | 5/2019 | Morin et al. | |
| 2020/0069141 A1 | 3/2020 | Cargill et al. | |

FOREIGN PATENT DOCUMENTS

| | | |
|---|---|---|
| CN | 106264335 | 1/2017 |
| CN | 106983448 | 7/2017 |
| CN | 107205602 | 9/2017 |
| CN | 107405031 | 11/2017 |
| CN | 107811578 | 3/2018 |
| CN | 112788973 | 5/2021 |
| CN | 112788973 | 4/2022 |
| JP | 2017536938 | 12/2017 |
| JP | 2018522613 | 8/2018 |
| WO | 2018118072 | 6/2018 |
| WO | WO-2020047303 A1 | 3/2020 |

OTHER PUBLICATIONS

"U.S. Appl. No. 16/555,483, Examiner Interview Summary dated Jan. 4, 2021", 3 pgs.
"U.S. Appl. No. 16/555,483, Non Final Office Action dated Oct. 6, 2020", 7 pgs.
"U.S. Appl. No. 16/555,483, Notice of Allowance dated Mar. 17, 2021", 7 pgs.
"U.S. Appl. No. 16/555,483, Response filed Jan. 5, 2021 to Non Final Office Action dated Oct. 6, 2020", 14 pgs.
"International Application Serial No. PCT/US2019/048887, International Preliminary Report on Patentability dated Mar. 11, 2021", 28 pgs.
"International Application Serial No. PCT/US2019/048887, International Search Report dated Nov. 14, 2019", 2 pgs.
"International Application Serial No. PCT/US2019/048887, Written Opinion dated Nov. 14, 2019", 26 pgs.
Wolff, et al., "U.S. Appl. No. 15/971,322, filed May 4, 2018".
"Chinese Application Serial No. 201980055516.7, Response filed Nov. 22, 2021 to Office Action dated Jul. 9, 2021", 4 pgs.
"Japanese Application Serial No. 2021-507746, Notification of Reasons for Refusal dated Sep. 13, 2021", w English Translation, 6 pgs.
"Japanese Application Serial No. 2021-507746, Response filed Dec. 9, 2021 to Notification of Reasons for Refusal dated Sep. 13, 2021", w English Claims, 16 pgs.
"Chinese Application Serial No. 201980055516.7, Office Action dated Jul. 9, 2021", w English Translation, 16 pgs.
"Japanese Application Serial No. 2021-507746, Voluntary Amendment filed Apr. 27, 2021", w English Claims, 15 pgs.
"Chinese Application Serial No. 201980055516.7, Voluntary Amendment filed Jun. 10, 2021", w English Claims, 26 pgs.
"European Application Serial No. 19855954.4, Response filed Oct. 14, 2021 to Communication pursuant to Rules 161(2) and 162 EPC dated Apr. 21, 2021", w English Claims, 23 pgs.
"European Application Serial No. 19855954.4, Extended European Search Report dated Apr. 19, 22", 4 pgs.

* cited by examiner

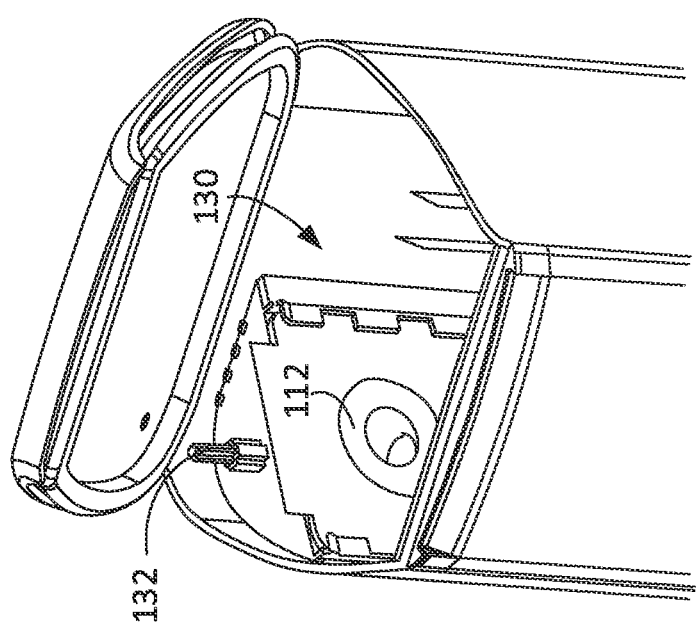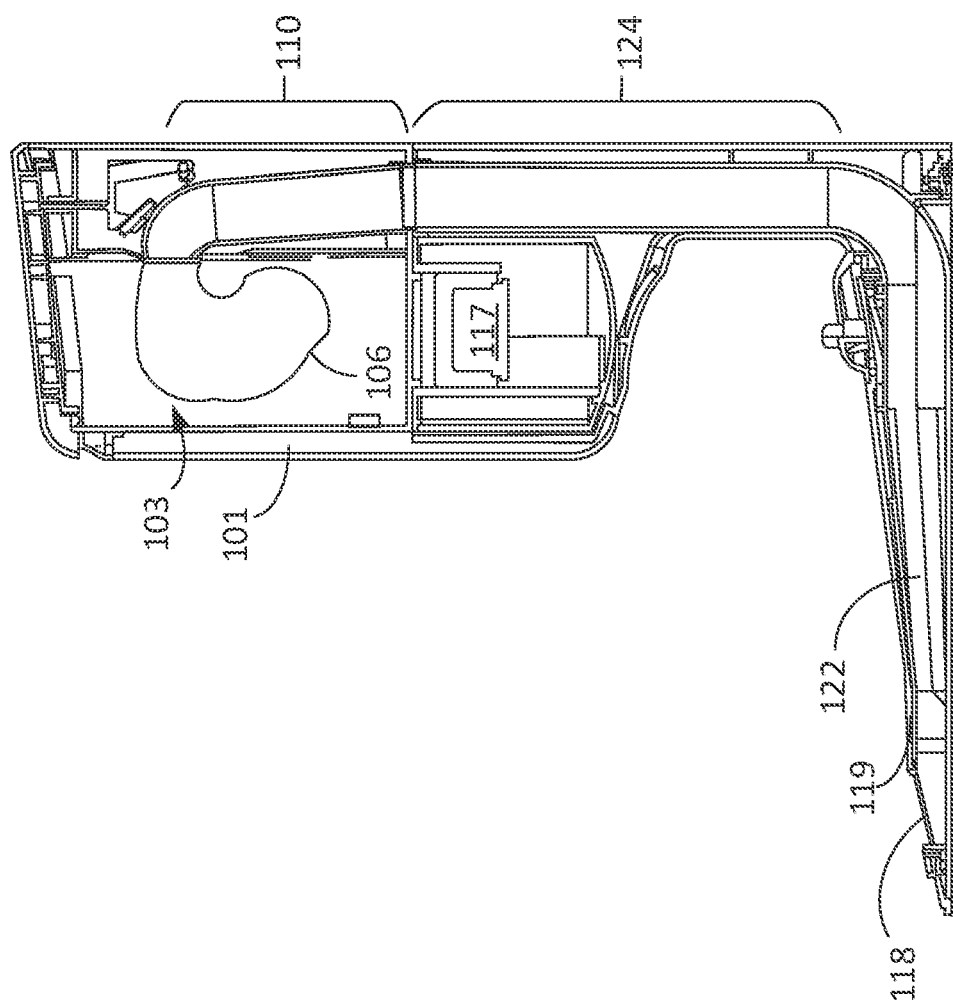

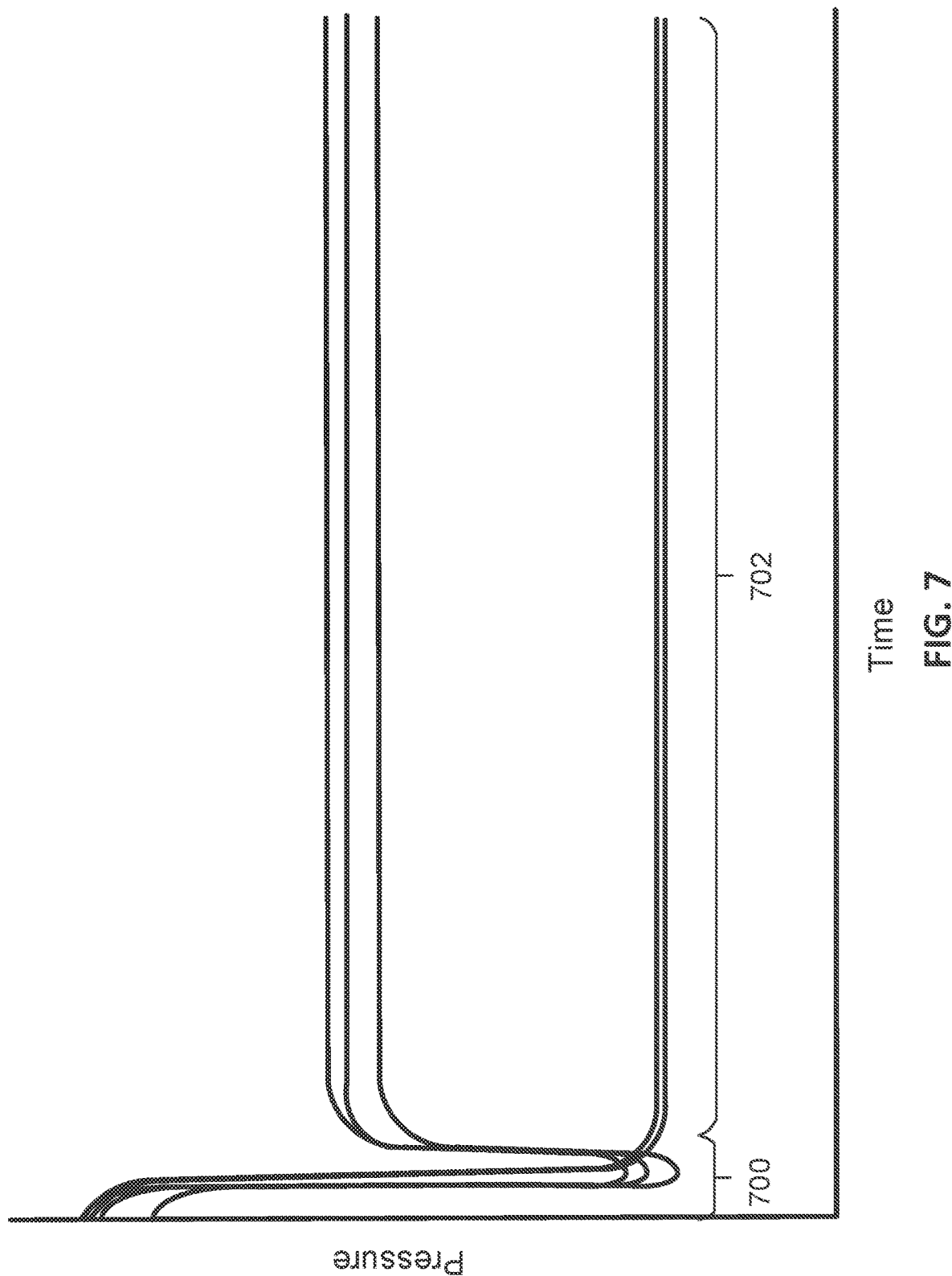

CONTROL OF EVACUATION STATIONS

CROSS-REFERENCE TO RELATED APPLICATIONS

This application is a continuation of U.S. patent application Ser. No. 16/555,483, filed Aug. 29, 2019, which application claims the benefit of priority to U.S. Application Ser. No. 62/724,792, filed on Aug. 30, 2018, both of which are incorporated herein by reference in their entireties.

TECHNICAL FIELD

This specification relates to control of evacuation stations.

BACKGROUND

Autonomous cleaning robots are robots which can perform desired cleaning operations, such as vacuum cleaning, in environments without continuous human guidance. An autonomous cleaning robot can automatically dock with an evacuation station for the purpose of emptying its debris bin of debris collected during a cleaning operation. The evacuation station can initiate an evacuation operation in which debris collected by the robot is drawn into the evacuation station, and this drawn debris can be stored in a receptacle within the evacuation station. During this evacuation operation, the evacuation station can activate a motor of the evacuation station and generate a vacuum such that the debris collected by the robot is drawn into the evacuation station and into the receptacle. The evacuation station can terminate the evacuation operation by deactivating the motor.

SUMMARY

Advantages of features described in this disclosure may include, but are not limited to, those described below and herein elsewhere. The systems, devices, methods, and other features described herein can improve the efficiency and performance of robotic cleaning systems including evacuation stations and autonomous cleaning robots.

The features described herein can reduce noise in an environment of an evacuation station. An air mover of an evacuation station can produce noise when activated, and this noise can propagate into the environment and disturb human users in the environment. The evacuation station can reduce an amount of time that the air mover is active and thereby reduce the amount of noise that is emitted into the environment. An evacuation station can thus draw debris from an autonomous mobile robot while a user is present in the environment without excessively disturbing the user.

The features described herein can allow an evacuation station to more accurately determine when an autonomous cleaning robot is properly evacuated as compared to conventional evacuation stations. The evacuation station can use information collected during previous evacuation operations performed by the evacuation station to distinguish between successful and failed evacuation operations. For example, in some implementations in which the evacuation station includes a sensor that can generate data indicative of an air pressure within the evacuation station, the evacuation station can determine a range of pressure values that correspond to a successful evacuation operation, and a range of pressure values that correspond to a failed evacuation operation. These ranges can accurately reflect a successfulness of an evacuation operation because the ranges are adjusted based on information collected during previous evacuation operations, including both failed and successful evacuation operations.

The features described herein can allow an evacuation station to adapt to changing conditions within flow paths of the evacuation stations. As the evacuation station performs evacuation operations, a portion of a flow path in the evacuation station may become clogged due to debris collected during the evacuation operations. For example, a receptacle for collecting debris in the evacuation station can become full of debris and thereby obstruct the flow path between the cleaning robot and the air mover. Because this obstruction can increase air pressure along the flow path, if an evacuation station uses a static range for pressure values that correspond to a successful evacuation operation, the evacuation station may prematurely indicate that its receptacle is full. The evacuation station described herein, by adaptively varying the range for pressure values that correspond to a successful evacuation operation, can reduce the likelihood of a premature indication that the receptacle is full. This can also reduce an amount of waste produced from replacing receptacles in the evacuation station because the evacuation station can use a greater portion of a capacity of each receptacle connected to the evacuation station.

In addition to adaptively varying the range for pressure values, the features described herein can allow an evacuation station to adaptively operate the air mover in response to changing pressure conditions with the evacuation stations. For example, in response to a high pressure value during an evacuation operation, an evacuation station can initiate a clog dislodgement behavior that aims to dislodge a clog that could potentially be causing the high pressure value. The evacuation station can thus autonomously respond to a potential clog within the evacuation station and remedy the clogs during the evacuation operation.

In one aspect, an evacuation station for collecting debris from a cleaning robot is featured. The evacuation station includes an intake configured to interface with the cleaning robot, a canister in pneumatic communication with the intake, an air mover in pneumatic communication with the canister, one or more sensors, and a controller. The canister is configured to receive a receptacle. The air mover is configured to, during evacuation operations, draw air from the canister into the air mover. The one or more sensors are configured to generate data indicative of an air pressure in the canister during an evacuation operation of the evacuation operations. The controller is configured to execute instructions to perform one or more operations. The one or more operations include initiating the evacuation operation of the evacuation operations such that the air mover draws air containing the debris through the intake and through the canister and such that the receptacle receives at least a portion of the debris drawn from the cleaning robot, and ceasing the evacuation operation in response to a pressure value being within a range. The pressure value is determined based at least in part on the data indicative of the air pressure, and the range is set based at least in part on a number of the evacuation operations initiated before the evacuation operation.

In another aspect, a method includes initiating an evacuation operation during which an air mover directs air containing debris from a cleaning robot into an evacuation station, and ceasing the evacuation operation in response to a pressure value being within a range. The evacuation operation is one of multiple evacuation operations. The pressure value is determined based at least in part on a measured air pressure within the evacuation station. The range is set based at least in part on a number of the evacuation operations initiated before the evacuation operation.

In another aspect, one or more computer readable media storing instructions that are executable by a processing device, and upon such execution cause the processing device to perform operations, is featured. The performed operations include initiating an evacuation operation during which an air mover directs air containing debris from a cleaning robot into an evacuation station, and ceasing the evacuation operation in response to a pressure value being within a range. The evacuation operation is one of multiple evacuation operations. The pressure value is determined based at least in part on a measured air pressure within the evacuation station. The range is set based at least in part on a number of the evacuation operations initiated before the evacuation operation.

Implementations of the evacuation stations and processes can include the examples described below and herein elsewhere.

In some implementations, the evacuation operation is a second evacuation operation. The data indicative of the air pressure can be data indicative of a second air pressure in the canister during the second evacuation operation. The measured air pressure can be a second measured air pressure within the evacuation station during the second evacuation operation. The one or more operations can further include initiating a first evacuation operation of the evacuation operations before initiating the second evacuation operation and during which the one or more sensors generates data indicative of a first air pressure in the canister. The method can further include initiating a first evacuation operation of the evacuation operations before initiating the second evacuation operation. The range can be set based at least in part on the data indicative of the first air pressure. In some implementations, the first evacuation operation and the second evacuation operation are consecutive evacuation operations.

In some implementations, the range is set based at least in part on a predicted value for the pressure value. In some implementations, the controller is configured to generate the predicted value for the pressure value using a Kalman filter. In some implementations, the method or the performed operations further include generating the predicted value for the pressure value using a Kalman filter. In some implementations, the range is set based at least in part on data indicative of an uncertainty associated with the predicted value. In some implementations, the range is set based at least in part on an uncertainty associated with the predicted value. In some implementations, ceasing the evacuation operation in response to the pressure value being within the range includes ceasing the evacuation operation in response to the pressure value being no more than an upper threshold of the range, and the upper threshold is greater than the predicted value for the pressure value by an amount proportional to the uncertainty associated with the predicted value. In some implementations, the data indicative of the uncertainty corresponds to data indicative of a variance associated with the predicted value. In some implementations, the uncertainty corresponds to a variance associated with the predicted value. The upper threshold can be greater than the predicted value for the pressure value by five to ten times the variance associated with the predicted value. In some implementations, ceasing the evacuation operation in response to the pressure value being outside of the range includes ceasing the evacuation operation in response to the pressure value being no less than a lower threshold of the range. The lower threshold can be less than the predicted value for the pressure value by an amount proportional to the uncertainty associated with the predicted value.

In some implementations, the data indicative of the predicted value are data indicative of a first predicted value. In some implementations, the predicted value is a first predicted value. The one or more operations, the method, or the performed operations can further include, after ceasing the evacuation operation, providing a human-perceptible indication of a full state of the receptacle in response to a second predicted value being above a receptacle-full threshold value. The second predicted value can be determined based at least in part on the first predicted value and the pressure value.

In some implementations, the pressure value is a second pressure value. In some implementations, the data indicative of the air pressure are data indicative of a second air pressure. In some implementations, the measured air pressure is a second measured air pressure. The one or more operations, the method, and the performed operations can further include during the evacuation operation, initiating an evacuation behavior during which the controller operates the air mover at an evacuation power level, and during the evacuation operation and after completion of the evacuation behavior, initiating a clog dislodgement behavior, during which the controller operates the air mover at the evacuation power level, in response to a first pressure value being outside of the range. The first pressure value can be determined based at least in part on a first air pressure in the canister during the evacuation behavior. In some implementations, the one or more sensors is configured to generate data indicative of the first air pressure during the evacuation behavior, and configurations of the one or more sensors to generate the data indicative of the second air pressure include configurations to generate the data indicative of the second air pressure after completion of the clog dislodgement behavior. In some implementations, the second pressure value is determined after completion of the clog dislodgement behavior. In some implementations, configurations of the one or more sensors to generate the data indicative of the first air pressure include configurations to generate the data indicative of the first air pressure at an end portion of the evacuation behavior. In some implementations, the first measured air pressure corresponds to an air pressure at an end portion of the evacuation behavior.

In some implementations, the air mover is configured to ramp up a power level of the air mover to the evacuation power level over a first length of time during the evacuation behavior and to ramp up the power level of the air mover to the evacuation power level over a second length of time during the clog dislodgement behavior. The first length of time can be the same as the second length of time. Alternatively, the first length of time can be greater than the second length of time. In some implementations, the second length of time is 25% to 75% of the first length of time. In some implementations, the first length of time is between 3 and 10 seconds, and the second length of time is between 0.5 and 4 seconds. In some implementations, the one or more operations, the method, or the performed operations further include deactivating the air mover before initiating the clog dislodgement behavior and after initiating the evacuation behavior.

In some implementations, the evacuation operation is a second evacuation operation. In some implementations, the data indicative of the air pressure are data indicative of a second air pressure in the canister during the second evacuation operation. In some implementations, the measured air pressure is a second measured air pressure. In some implementations, the pressure value is a second pressure value. The one or more operations, the method, or the performed operations can further include initiating a first evacuation operation. The one or more sensors can generate data indicative of a first air pressure in the canister. The one or more operations, the method, or the performed operations can further include providing a human-perceptible indication indicating an evacuation failure in response to a first pressure value being outside of the range. The first pressure value can be determined based at least in part on the first air pressure in the canister.

In some implementations, providing the human-perceptible indication in response to the first pressure value being outside of the range includes providing the human-perceptible indication in response to the first pressure value being no less than an upper threshold of the range. In some implementations, providing the human-perceptible indication in response to the first pressure value being no less than the upper threshold of the range includes providing the human-perceptible indication in response to the first pressure value being no less than the upper threshold, and a total duration of the first evacuation operation being greater than an amount of time. In some implementations, the amount of time is between 10 seconds and 1 minute. In some implementations, providing the human-perceptible indication in response to the first pressure value being no less than the upper threshold of the range includes providing the human-perceptible indication in response to the first pressure value being no less than the upper threshold, and a total number of attempts to dislodge a clog in the evacuation station being no less than a number. In some implementations, providing the human-perceptible indication in response to the first pressure value being outside of the range includes providing the human-perceptible indication in response to the first pressure value being no greater than a lower threshold of the range. In some implementations, the human-perceptible indication indicates a failure of a seal in the evacuation station.

In some implementations, the receptacle is formed at least in part by a replaceable filter bag.

In some implementations, the one or more sensors is positioned within the canister. In some implementations, the one or more sensors comprises an air pressure sensor. In some implementations, the one or more sensors includes a movable plunger configured to contact a wall of the receptacle such that expansion of the wall as the receptacle receives the debris moves the plunger. In some implementations, configurations of the one or more sensors to generate the data indicative of the air pressure include configurations of the one or more sensors to generate the data indicative of the air pressure at an end portion of the evacuation operation. In some implementations, the measured air pressure corresponds to an air pressure at an end portion of the evacuation operation.

In some implementations, the one or more sensors is configured to generate data indicative of an ambient air pressure in the canister, and the pressure value corresponds to a difference between the air pressure and the ambient air pressure. In some implementations, the one or more operations, the method, or the performed operations include measuring an ambient air pressure in the evacuation station, and the pressure value corresponds to a difference between the measured air pressure and the ambient air pressure. In some implementations, configurations of the one or more sensors to generate the data indicative of the ambient air pressure in the canister includes configurations to generate the data indicative of the ambient air pressure while the air mover is inactive. In some implementations, measuring the ambient air pressure includes measuring the ambient air pressure while the air mover is inactive. In some implementations, the one or more operations, the method, or the performed operations further include during the evacuation operation, determining a line voltage delivered to the evacuation station, and reducing the line voltage to below a maximum allowable line voltage.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 3 is a side cross-sectional view of the evacuation station of FIG. 1.

FIG. 4 is a top perspective view of an upper portion of the evacuation station of FIG. 1.

FIGS. 7-10 are graphs illustrating examples of data collected during evacuation operations.

Like reference numbers and designations in the various drawings indicate like elements.

DETAILED DESCRIPTION

An evacuation station for an autonomous cleaning robot can be used to move debris collected by the robot into a receptacle in the evacuation station. The debris can be moved during an evacuation operation, which can occur between cleaning operations of the robot or between portions of a single cleaning operation. During a cleaning operation, the robot can autonomously move about a floor surface and collect debris from the floor surface. The evacuation station is statically positioned on the floor surface while the robot autonomous moves about the floor surface. After the robot performs the cleaning operation or a portion of the cleaning operation and collects debris, the robot can dock with the evacuation station. With the robot docked with the evacuation station, the evacuation station can generate an airflow to draw debris contained in the robot into a receptacle of the evacuation station, thereby clearing capacity in the debris bin of the robot to collect more debris in another cleaning operation. This enables the robot to perform another cleaning operation or to continue a cleaning operation to collect more debris from the floor surface.

To draw the debris from the robot, an air mover within the evacuation station can be activated to produce the airflow through the evacuation station to move debris from the robot into the receptacle. In some cases, an obstruction or a leak can decrease an operational efficiency of the air mover because the obstruction or the leak can result in flow rate losses for the airflow between the robot and the evacuation station. An obstruction can increase air pressure along a portion of a flow path for the airflow, thereby resulting in a flow rate loss, and a leak can create a parallel flow path, thereby resulting in a flow rate loss along the flow path between the robot and the evacuation station. An obstruction can be caused by debris collected along the flow path, e.g., within a replaceable receptacle of the evacuation station. A leak can be caused by improper docking between the robot and the evacuation station or by an improper interface between a canister of the evacuation station and the receptacle. As described herein, during an evacuation operation, the evacuation station can operate adaptively and predict pressure values based on measured air pressures from previous evacuation operations. The predicted pressure values and the measured pressure values can be used to accurately determine whether an obstruction or a leak is present. The predicted values can also allow the evacuation station to more accurately determine whether a pressure value for a current evacuation operation is indicative of a successful evacuation or a failed evacuation, and thus enable the evacuation station more efficiently collect debris from the robot.

Example Systems

Figure 1:
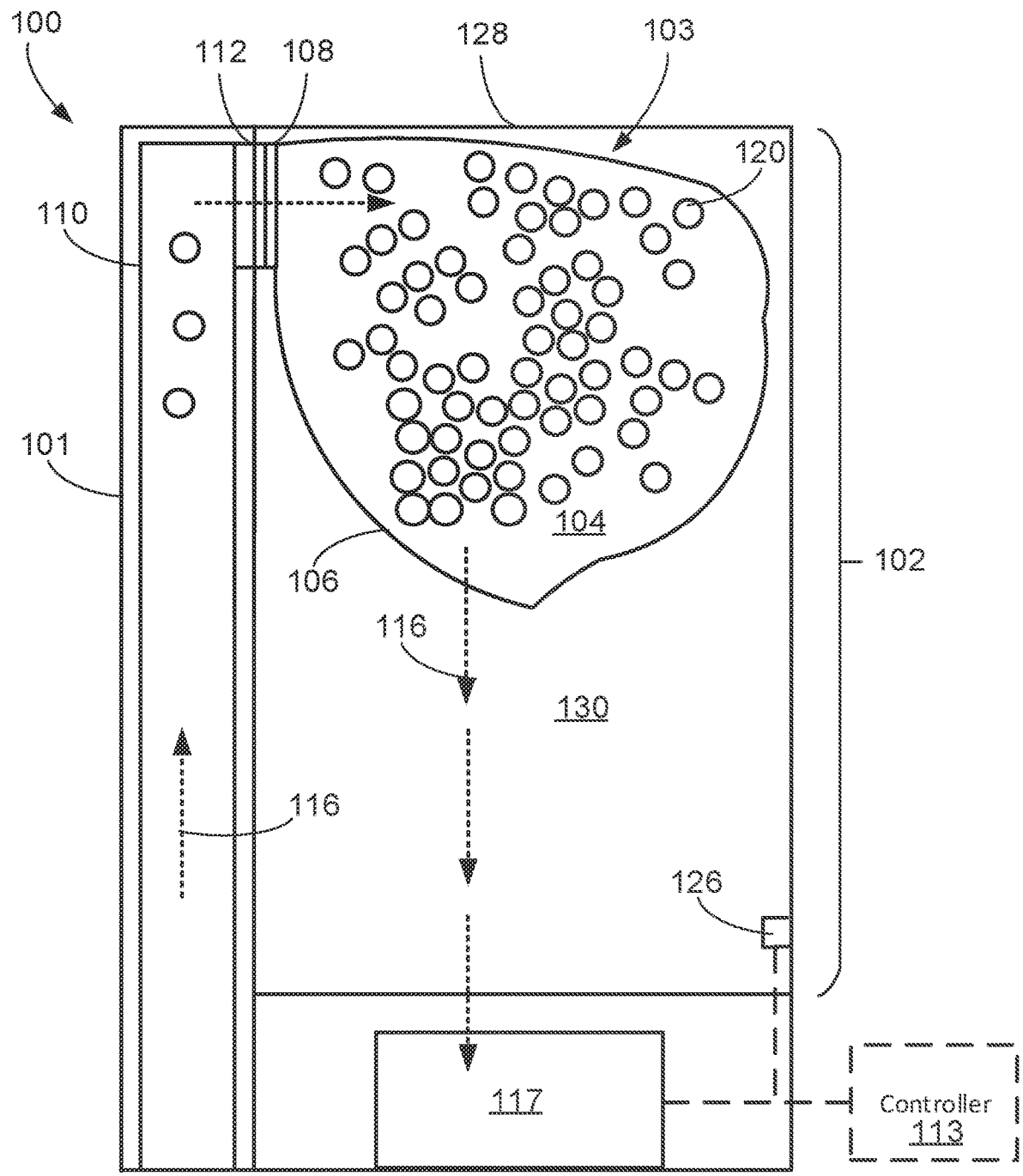
FIG. 1 is a schematic side view of a portion of an evacuation station.

A robotic cleaning system can include an evacuation station and an autonomous cleaning robot. Referring to FIG. 1, an evacuation station 100 includes a housing 101 (shown in FIGS. 1-4). The housing 101 of the evacuation station 100 can include one or more interconnected structures that support various components of the evacuation station 100. These various components include an air mover 117, a system of airflow paths for airflow generated by the air mover 117, and a controller 113.

Figure 2:
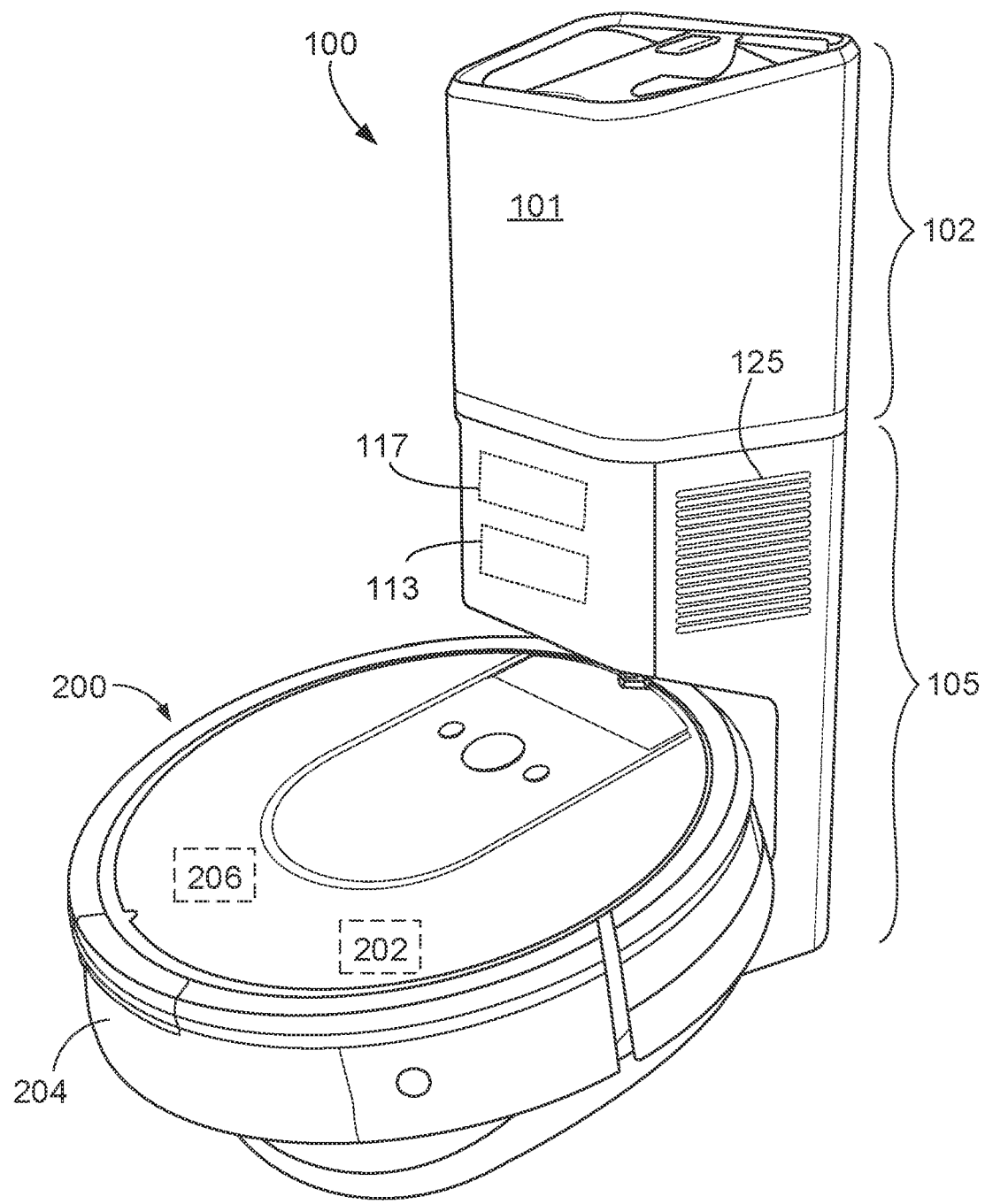
FIG. 2 is a front perspective view of a system including an autonomous mobile robot and the evacuation station of FIG. 1.

Referring to FIG. 2, the housing 101 includes a canister 102 and a base 105. In the example shown in FIG. 2, the canister 102 corresponds to a top portion of the evacuation station 100 and is located on top of the base 105. The canister 102 is configured to receive a receptacle for collecting debris from an autonomous cleaning robot. For example, the canister 102 can receive a filtering device 103 with a receptacle 104 for debris. In some implementations, the canister 102 is removable from the base 105, while in other implementations, the canister 102 is integral with the base 105.

Referring to FIG. 1, the air mover 117 is part of a vacuum system (e.g., including a motor, an impeller, ducts, or a combination thereof) that forces air through the evacuation station 100. The air mover 117 of the evacuation station 100 is configured to produce an airflow 116 through the robot, through the evacuation station 100, through the air mover 117, and out through an exhaust 125 (shown in FIG. 2). The air mover 117 is in pneumatic communication with the canister 102, in particular, an interior 130 of the canister 102 such that activation of the air mover 117 causes air to be drawn through the interior 130 into the air mover 117. For example, the air mover 117 can be positioned below the canister 102 in the base 105 of the evacuation station 100, and the evacuation station 100 can include an airflow channel extending from a bottom portion of the canister 102 to a top portion of the base 105. To generate the airflow 116, the air mover 117 can include an actuator, e.g., a motor, and an impeller that is rotated in response to activation of the actuator.

The filtering device 103 can be received within the canister 102, e.g., within the interior 130 of the canister 102.

In some implementations, the filtering device 103 includes a filter bag 106 at least partially forming the receptacle 104. The filtering device 103 further includes an inlet 108. The inlet 108 is configured to interface with an outlet of one or more conduits of the evacuation station 100. For example, the one or more conduits of the evacuation station 100 includes a conduit 110 that includes an outlet 112 configured to interface with the inlet 108.

The filter bag 106 can be a replaceable filter bag. For example, the filtering device 103 can be a replaceable device that can be disposed of after the filtering device 103 is full of debris. A new filtering device 103 can then be placed into the evacuation station 100 to enable the evacuation station 100 to collect more debris from an autonomous cleaning robot.

FIG. 1 illustrates the evacuation station 100 during an evacuation operation. During the evacuation operation, the controller 113 operates the air mover 117 to generate the airflow 116 through air pathways of the evacuation station 100. Referring to FIG. 2 showing a system including the evacuation station 100 and an autonomous cleaning robot 200, the evacuation station 100 performs an evacuation operation when the autonomous cleaning robot 200 interfaces with the evacuation station 100.

The robot 200 can perform a cleaning operation in a room, e.g., a room of a commercial, residential, industrial, or other type of building, and collects debris from a floor surface of the room as the robot 200 autonomously moves about the room. The robot 200 includes implements that enable the robot to collect the debris from the floor surface. For example, the robot 200 can include an air mover 202 that draws air from a portion of the floor surface below the robot 200 and hence draws any debris on that portion of the floor surface into the robot 200. The air mover 202 can include an impeller and a motor that can be activated to rotate the impeller to generate airflow to draw the air into the robot 200. The robot 200 can also include one or more rotatable members (not shown) facing the floor surface that engage the debris on the floor surface and mechanically moves the debris into the robot 200. The one or more rotatable members can include a roller, a brush, a flapper brush, or other rotatable implements that can engage debris and direct the debris into the robot 200. The debris collected from the floor surface is directed into a debris bin 204 of the robot 200. A controller 206 of the robot 200 operates a drive system (not shown) of the robot 200, e.g., including motors and wheels that are operable to propel the robot 200 across the floor surface, to navigate the robot 200 about the room and thereby clean different portions of the room.

During the cleaning operation, the controller 206 can determine that the debris bin 204 is full. For example, the controller 206 can determine that debris accumulated in the debris bin 204 has exceeded a certain percentage of the total debris capacity of the debris bin 204, e.g., more than 70%, 80%, or 90% of the total debris capacity of the debris bin 204. After making such a determination, the controller 206 operates the drive system of the robot 200 to direct the robot 200 toward the evacuation station 100. In some implementations, the robot 200 includes a sensor system including an optical sensor, an acoustic sensor, or other appropriate sensor for detecting the evacuation station 100 during the robot's navigation about the room to find the evacuation station 100.

The evacuation station 100 can perform an evacuation operation to draw debris from the debris bin 204 of the robot 200 into the evacuation station 100. To enable the evacuation station 100 to remove debris from the robot 200, the robot 200 interfaces with the evacuation station 100. For example, the robot 200 can autonomously move relative to the evacuation station 100 to physically dock to the evacuation station 100. In other implementations, a conduit (not shown) of the evacuation station 100 is manually connected to the robot 200. To interface with the evacuation station 100, in some implementations, an underside of the robot 200 includes an outlet (not shown) that engages with an intake 118 of the evacuation station 100, shown in FIG. 3. The intake 118 is configured to interface with the robot 200 and is in pneumatic communication with the canister 102, e.g., in pneumatic communication with one or more conduits of the evacuation station 100 that in turn are in pneumatic communication with the interior 130 of the canister 102. The outlet of the robot 200 can be located on an underside of the debris bin 204 and can be an opening that engages with a corresponding opening of the intake 118. The intake 118 can be positioned along a platform 119 of the base 105, the platform 119 being positioned to receive the robot 200 as the robot 200 docks with the evacuation station 100. The intake 118 can be an opening along the platform 119.

The robot 200, the evacuation station 100, or both the robot 200 and the evacuation station 100 can include a valve mechanism that opens only when the air mover 117 generates a negative pressure during the evacuation operation. For example, a valve mechanism (not shown) of the robot 200 can include a door, flap, or other openable device that only opens in response to a negative pressure on the underside of the debris bin 204, e.g., a negative pressure generated by the air mover 117 of the evacuation station 100.

While the robot 200 interfaces with the evacuation station 100, the debris bin 204 is in pneumatic communication with the air mover 117 of the evacuation station 100. In addition, in some implementations, the robot 200 is in electrical communication with the evacuation station 100 such that the evacuation station 100 can charge a battery of the robot 200 when the robot 200 interfaces with the evacuation station 100. Thus, while interfaced with the robot 200, the evacuation station 100 can simultaneously evacuate debris from the robot 200 and charge the battery of the robot 200. In other implementations, the evacuation station 100 charges the battery of the robot 200 only while the evacuation station 100 is not evacuating debris from the robot 200. For example, the evacuation station 100 can charge the battery of the robot 200 after completion of an evacuation operation or before initiation of an evacuation operation. The evacuation station 100 can sequentially charge the battery of the robot 200 and evacuate debris from the robot 200 to reduce a power load on electrical components of the evacuation station 100.

Referring also to FIG. 1, during the evacuation operation while the evacuation station 100 is interfaced with the robot 200, the airflow 116 generated by the evacuation station 100 travels through the debris bin 204, through airflow pathways of the evacuation station 100, and through the filtering device 103 while carrying debris 120 drawn from the robot 200. The airflow pathways of the evacuation station 100 include the one or more conduits of the evacuation station 100. In addition to including the conduit 110, the one or more conduits can also include conduits 122, 124. The conduit 122 includes the intake 118 of the evacuation station 100 and is connected with the conduit 124, and the conduit 124 is connected with the conduit 110. In this regard, the airflow 116 travels through the one or more conduits of the evacuation station 100 by traveling through the conduit 122, the conduit 124, and conduit 110. The airflow 116 exits the one or more conduits through the outlet 112 into the inlet 108 of the filtering device 103, and then into the receptacle 104. The airflow 116 further travels through a wall of the filter bag 106 toward the air mover 117. The wall of the filter bag 106 serves as a filtering mechanism, separating a portion of the debris 120 from the airflow 116.

In some implementations, the evacuation station 100 can include a removable filter (not shown). The filter can be a small or fine particle filter. For example, particles having a width between about 0.1 to 0.5 micrometers carried by the airflow 116 after the airflow 116 exits the filtering device 103 are removed by the filter. The filter can be positioned between the filtering device 103 and the air mover 117. After the airflow 116 exits the filtering device 103 and travels beyond the filter, the air mover 117 directs the airflow 116 out of the evacuation station 100, in particular, through an exhaust 125 (shown in FIG. 2).

As described herein, the evacuation station 100 can continue to perform the evacuation operation until a sensor 126 (shown in FIGS. 1 and 3) of the evacuation station 100 detects that the receptacle 104 is full. The sensor 126 can be configured to generate data indicative of an air pressure in the canister during the evacuation operation. For example, the sensor 126 can be an air pressure sensor responsive to changes in pressure within the interior 130 of the canister 102 or other changes along flow paths of the evacuation station 100.

The filtering device 103, and hence the receptacle 104, can be disconnected and removed from the evacuation station 100. Referring to FIG. 4, the housing 101 of the evacuation station 100 includes a cover 128 along the canister 102 of the evacuation station 100. The cover 128 covers an interior 130 of the evacuation station 100. The interior 130 can receive the filtering device 103. The cover 128 is movable between a closed position (shown in FIG. 3) and an open position (shown in FIG. 4). In the open position of the cover 128, a filtering device is insertable into the interior 130 or is removable from the interior 130. For example, the filtering device 103 can be placed into the receptacle to be connected with the one or more conduits of the evacuation station 100. In addition, the filtering device 103 can be disconnected from the one or more conduits of the evacuation station and then removed from the interior 130, thereby enabling a new filtering device to be inserted into the receptacle.

In some implementations, the conduit 110 of the evacuation station 100 is movable in response to movement of the cover 128. For example, when the cover 128 is moved from the closed position to the open position, the conduit 110 moves such that the outlet 112 of the conduit 110 moves into the interior 130. The conduit 110 moves from a receded position (shown in FIG. 4) to a protruded position (not shown). In the receded position, the outlet 112 of the conduit 110 is recessed in the housing 101. In the protruded position, the conduit 110 protrudes from the housing 101 into the interior 130 such that the outlet 112 moves into to the interior 130. In some implementations, the conduit 110 is connected to the conduit 124 in a manner that allows the conduit 110 to pivot or flex relative to the conduit 124, thereby enabling the conduit 110 to move relative to the housing 101.

The evacuation station 100 includes a mechanism for triggering such movement of the conduit 110 in response to movement of the cover 128 from the open position to the closed position. For example, the mechanism includes a movable post 132 that is translated in response to movement of the cover 128 from the open position to the closed position. A cam (not shown) on the conduit 110 is configured to interface with the movable post 132 such that, when the movable post 132 moves in response to the movement of the cover 128, the outlet 112 of the conduit 110 moves further into the interior 130. As described herein, this inward movement of the outlet 112 causes the outlet 112 to engage with the inlet 108 of the filtering device 103.

Figure 5:
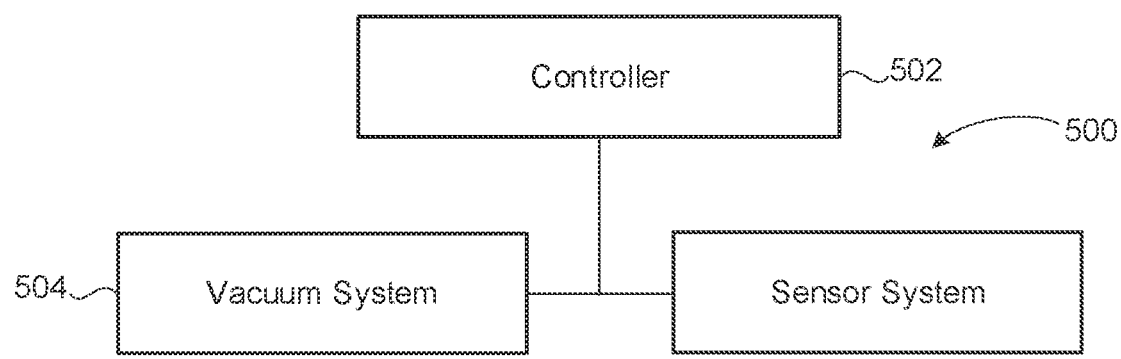
FIG. 5 is a block diagram of a control system for an evacuation station.

FIG. 5 illustrates an example of a control system 500 for the evacuation station 100. The control system 500 includes the controller 113, a vacuum system 502, and a sensor system 504. The controller 113 can execute one or more instructions to execute one or more operations in connection with the evacuation station 100. For example, the controller 113 can control operations of the vacuum system 502 and the sensor system 504. The controller 113 in some implementations can receive information from the vacuum system 502 and the sensor system 504 that the controller 113 can use for adjusting settings for controlling the vacuum system 502 and the sensor system 504. The vacuum system 502 is operable to create airflow through the evacuation station 100. The vacuum system 502, for example, includes the air mover 117. The sensor system 504 includes one or more sensors of the evacuation station 100. The one or more sensors can generate information usable by the controller 113. For example, the sensor system 504 can include the sensor 126, which can generate data indicative of air pressure in the evacuation station.

In some implementations, the control system 500 can further include other systems for interacting with the robot 200. For example, the control system 500 can include a charging system that transmits energy to the robot 200 to recharge the robot 200. The charging system can include electrical contacts that interface with electrical contacts of the robot 200. In some implementations, the charging system includes a wireless charging device that can charge the robot 200.

Example Processes

Figure 6A:
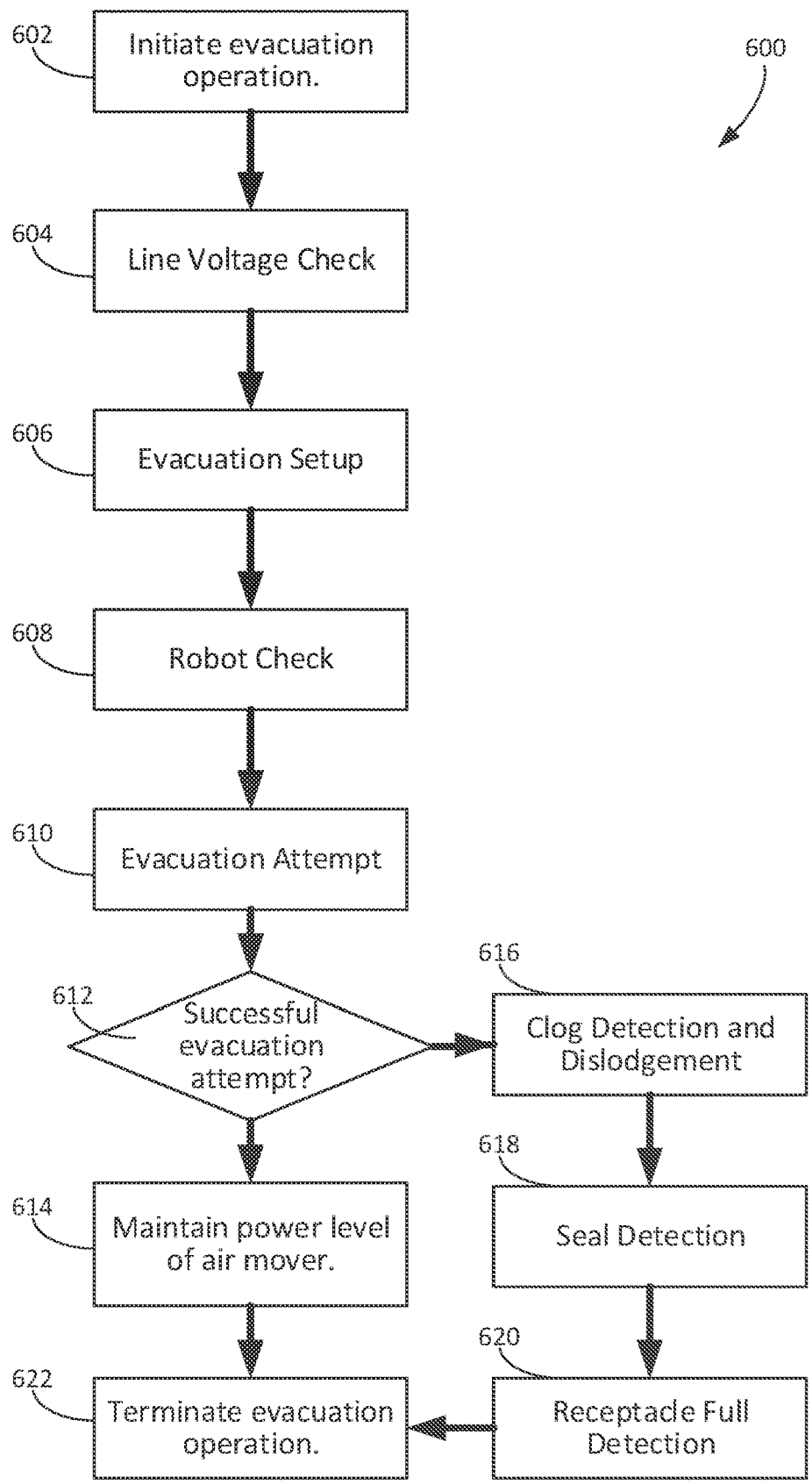
FIG. 6A illustrates a process for evacuating debris from an autonomous mobile robot.

FIG. 6A illustrates an example of a process 600 of controlling an evacuation operation of the evacuation station 100. In some implementations, the process 600 can be initiated after the robot 200 is docked with the evacuation station 100 or in response to the robot 200 being docked with the evacuation station 100. As described herein, the process 600 allows the evacuation station 100 to generate an airflow, e.g., the airflow 116, to draw debris collected in the robot 200 into the receptacle 104 in the evacuation station 100.

The process 600, its operations, and its suboperations can be performed by a controller, e.g., the controller 113. In some implementations, at least some of the operations of the process 600 are performed by other parts of a control system for an evacuation station, e.g., the control system 500. As shown in FIG. 6A, the process 600 includes operations 602, 604, 606, 608, 610, 612, 614, 616, 618, 620, 622. One or more of these operations can include suboperations, as described herein.

At the operation 602, an evacuation operation is initiated. The controller 113, for example, initiates the evacuation operation. The evacuation operation can be initiated in response to a request from the robot 200 to initiate the evacuation operation. Alternatively, the evacuation station 100 can detect the presence of the robot 200 at the evacuation station and initiate the evacuation operation in response to detecting the presence of the robot 200. Furthermore, in some implementations, before the evacuation operation is determined, the evacuation station 100 determines whether a filtering device, e.g., the filtering device 103, is received in the evacuation station 100. Operations performed during the evacuation operation can include the operations between the evacuation operation initiating at the operation 602 and the evacuation operation terminating at the operation 622. In this regard, after the evacuation operation is initiated, the evacuation station 100 attempts to produce an airflow to draw debris from the robot 200. During the evacuation operation, the controller 113 or other components of the control system 500 can perform certain operations for producing the airflow through the evacuation station 100 to draw debris from the robot 200.

Figure 6B:
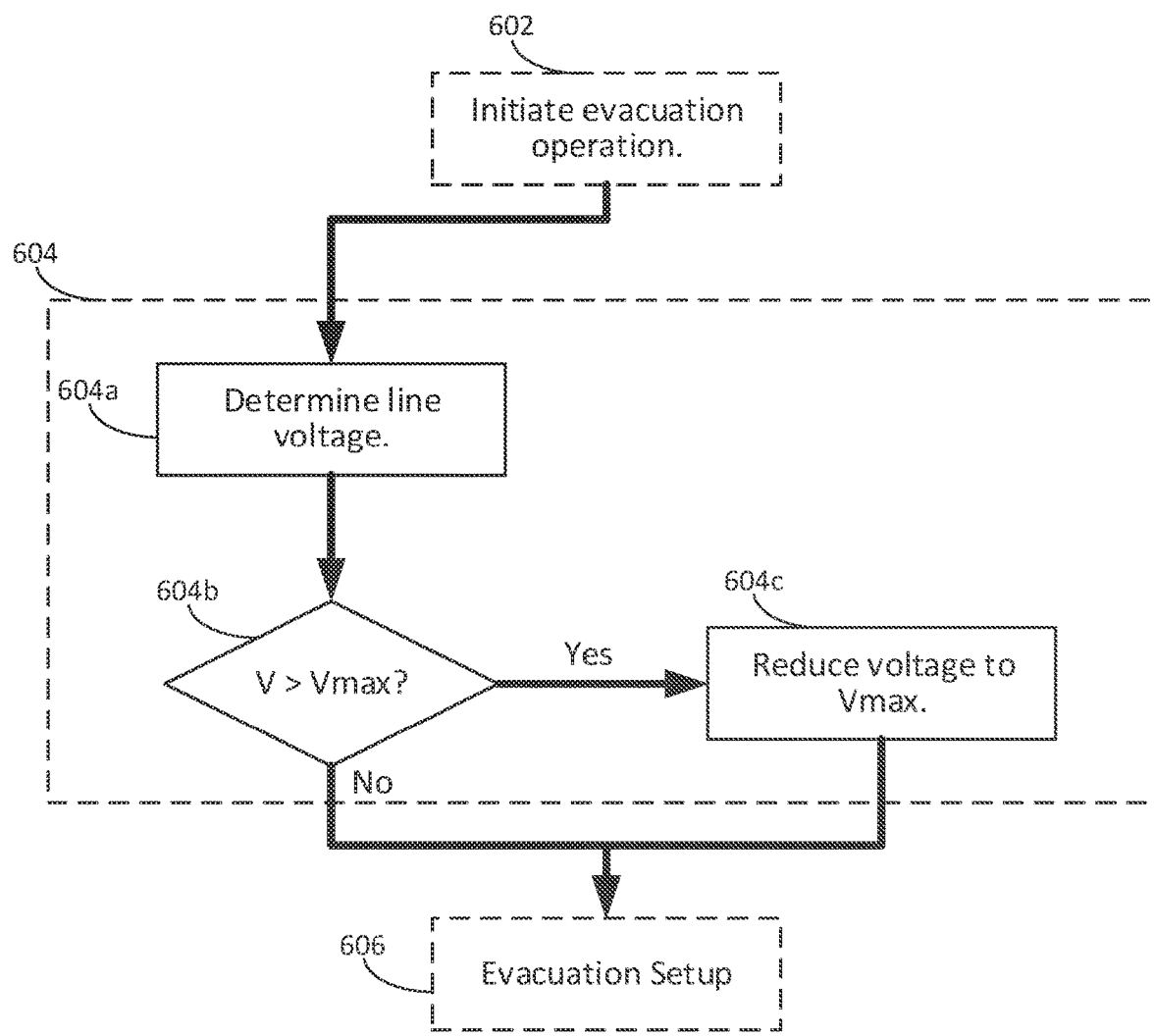
FIGS. 6B-6I illustrate suboperations for the process of FIG. 6A.

At the operation 604, a line voltage check is performed. The line voltage check can be performed to reduce a likelihood that the air mover 117 is damaged from excessive voltage. The operation 604 can be performed before the air mover 117 is activated. FIG. 6B illustrates an example process for the operation 604 to perform the line voltage check.

After the evacuation operation is initiated at the operation 602, a line voltage of an electrical line delivering energy to the evacuation station 100 is determined at a suboperation 604a. The controller 113 can determine the line voltage using a sensor. For example, the evacuation station 100 can include a voltage sensor along an electrical line delivering power to the evacuation station 100. The voltage sensor can generate a signal indicative of the voltage in the electrical line. The controller 113 can measure the line voltage using the signal generated by the voltage sensor. At the suboperation 604b, the line voltage is compared to a maximum allowable voltage. The controller 113 can determine whether the line voltage is greater than the maximum allowable voltage. The maximum allowable voltage can correspond to a voltage specification for a motor of the air mover 117. If the line voltage measured at the suboperation 604a is greater than the maximum allowable voltage, at the suboperation 604c, the line voltage is reduced to a value below the maximum allowable voltage. For example, the controller 113 can operate a voltage converter of the evacuation station 100 to maintain the line voltage below the maximum allowable voltage.

Figure 6C:
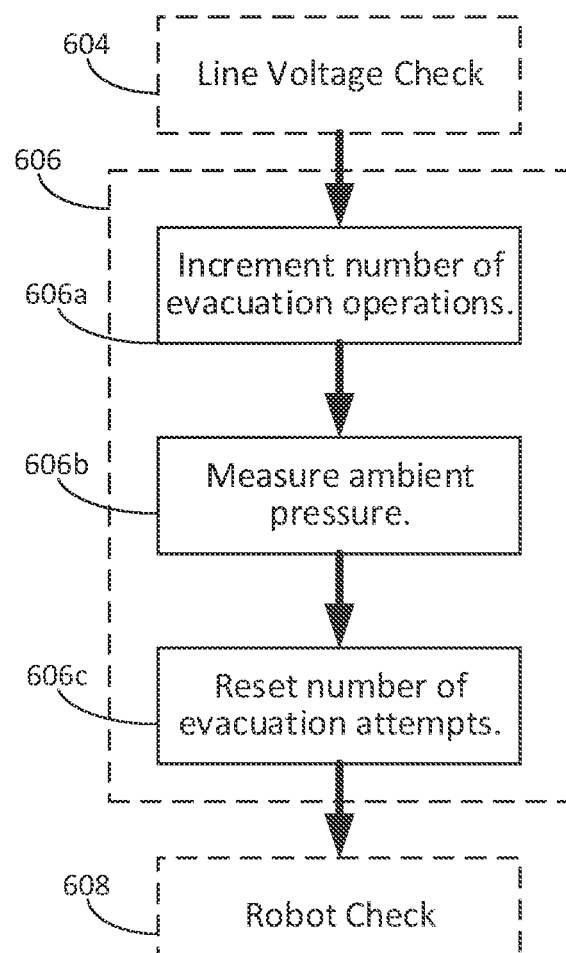
Figure 6D:
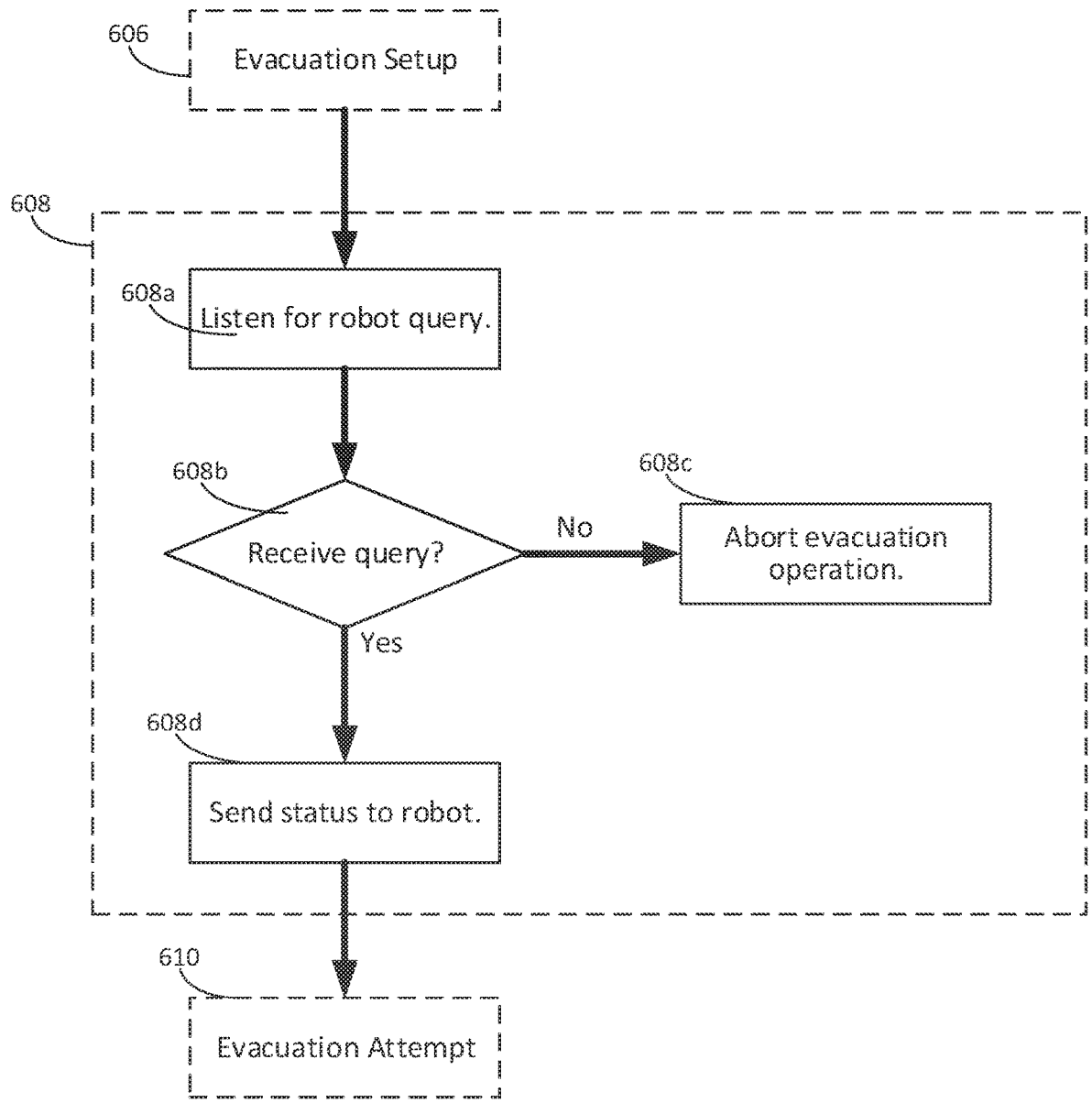

If the line voltage measured at the operation 604b is no more than the maximum allowable voltage, the process 600 can continue to a subsequent operation. For example, as shown in FIG. 6A, at the operation 606, an evacuation setup can be performed. During the evacuation setup, preliminary measurements can be performed and the controller 113 can be set up in preparation for performing an evacuation attempt. FIG. 6C illustrates an example of a process for the operation 606 to perform the evacuation setup. The evacuation setup operation includes suboperations 606a, 606b, and 606c.

At the suboperation 606a, a number of evacuation operations is incremented. The number of evacuations can correspond to an index for the current evacuation operation. The evacuation station 100 can track the number of evacuation operations, and this tracked number of evacuation operations can be used for predicting pressure values, as described herein. The controller 113 can store data indicative of the number of evacuation operations, and can increment the number of evacuation operations by modifying the stored data.

The number of evacuation operations can correspond to a number of evacuation operations since a receptacle was most previously replaced in the evacuation station 100. For example, the receptacle can be part of a disposable device such as the filtering device 103, and the number of evacuation operations can correspond to the number of evacuation operations initiated by the evacuation station 100 since the filtering device 103 was connected to the evacuation station 100. In some implementations, the evacuation station 100 can be manually operated by a user, e.g., using a user interface for the evacuation station 100 or using a user device in communication with the evacuation station 100, to reset the number of evacuation operations. In some implementations, the evacuation station 100 can automatically detect when a new filtering device is connected to the evacuation station 100 and can reset the number of evacuation operations to zero in response to detect that the new filtering device is connected.

At the suboperation 606b, an ambient air pressure is measured. The controller 113 can measure the ambient air pressure using the sensor 126. The ambient air pressure corresponds to an ambient air pressure within the evacuation station 100, e.g., in the interior 130 of the canister 102. The ambient air pressure can also correspond to an air pressure in an environment of the evacuation station 100. In this regard, the sensor 126 can generate data indicative of the ambient air pressure in the canister 102. The ambient air pressure is measured when the air mover 117 is inactive, e.g., when a motor of the air mover 117 is not rotating. As described herein, the controller 113 can use this measured ambient air pressure for determining a pressure value that does not depend on air pressure in an environment of the evacuation station 100, e.g., in the room where the evacuation station 100 is stationed. For example, the pressure value can be proportional to a difference between (i) a measured air pressure when the air mover 117 is activated and (ii) the ambient air pressure when the air mover 117 is not activated. This pressure value, as described herein, can be used for controlling the evacuation operation.

At the suboperation 606c, a number of evacuation attempts is reset. The number of evacuation attempts corresponds to a number of times in which the evacuation station 100 performs an evacuation behavior during the evacuation operation. As described herein, the number of evacuation attempts can be limited in order to restrict an amount of time that the evacuation station 100 is being operated such that the noise produced by the evacuation station 100 is restricted. The number of previously performed evacuation attempts can be stored as data by the controller 113. At the suboperation 606c, the controller 113 resets the number of evacuation attempts to zero.

After the evacuation setup is performed at the operation 606, at the operation 608, a robot check is performed. During the robot check, the controller 113 verifies that the robot 200 is still interfacing with the evacuation station 100. For example, in some cases, the robot 200 may be removed from the evacuation station 100 after the evacuation operation is initiated at the operation 602. A user may manually move the robot 200 relative to the evacuation station 100, or the robot 200 may be inadvertently moved away from the evacuation station 100 such that the robot 200 and the evacuation station 100 are no longer interfacing with one another. Accordingly, before an air mover evacuation cycle is performed at the operation 612, the evacuation station 100 can abort the evacuation operation so that the air mover 117 of the evacuation station 100 is not activated without an autonomous cleaning robot docked with the evacuation station 100. FIG. 6C illustrates an example of a process for the operation 608 to perform the robot check. The operation 608 includes suboperations 608a, 608b, 608c, and 608d.

At the suboperation 608a, the evacuation station 100 listens for a query from the robot 200. For example, the message from the robot 200 can be delivered electrically through the electrical contacts of the robot 200 and the electrical contacts of the evacuation station 100. In some implementations, the robot 200 transmits the query using a wireless transceiver or wireless transmitter on the robot 200, and the evacuation station 100 receives the query using a wireless transceiver or wireless receiver on the evacuation station 100. The robot 200 can directly transmit the query to the evacuation station 100. Alternatively, the robot 200 can wirelessly transmit the query to a remote server in communication with the evacuation station 100, and the evacuation station 100 can receive the query from the remote server. The robot 200 can transmit the query, for example, only if the robot 200 is docked with the evacuation station 100.

At the suboperation 608b, the evacuation station 100 determines whether a query from the robot 200 was received. The controller 113 can determine whether a query is received within a limited amount of time, e.g., within 1 second, 2 seconds, 3 seconds, or more. If the query is not received, the evacuation operation is aborted at the suboperation 608c. In some implementations, the controller 113 can cause a notification to be provided to a user. The notification can indicate a failure of communication between the robot 200 and the evacuation station 100. In some implementations, if the evacuation operation is aborted at the suboperation 608c, the evacuation station 100 causes an instruction to be provided to a user to remedy the failure of communication. For example, the instruction may request that the user replace the robot 200 on the evacuation station 100, or may request that the user operate the robot 200 or the evacuation station 100 in a manner that causes the robot 200 to be docked with the evacuation station 100. In some implementations, the instruction may request the user to issue a command for the robot 200 to dock with the evacuation station 100, and the robot 200 autonomously moves across the floor surface to dock with the evacuation station 100. To cause the notification or the instructions to be provided, the controller 113 can control an indicator device of the evacuation station 100, e.g., an auditory or visual indicator device of the evacuation station 100. The visual indicator device can include a display, an indicator light, or other device for providing a visual indication to a user. In some implementations, to cause the notification or the instructions to be provided, the controller 113 can cause a user device to provide the notification.

If the query is received, e.g., within the limited amount of time, a status is transmitted to the robot 200 at the suboperation 608c. The evacuation station 100 can transmit a status of the evacuation station 100 to the robot 200. The status of the evacuation station 100 can indicate that the evacuation station 100 is ready to evacuate debris from the robot 200. If the query is not received, e.g., within the limited amount of time, the evacuation operation is aborted at the suboperation 608d. After the evacuation operation is aborted, the evacuation station 100 can be placed on standby until an evacuation process, e.g., the evacuation process 600, is initiated again.

At the operation 610, an evacuation attempt is performed. During the evacuation attempt, the evacuation station 100 attempts to draw debris from the receptacle 104. To perform the evacuation attempt, the evacuation station 100 initiates an evacuation behavior in which the evacuation station 100 attempts to create an airflow for drawing debris from the receptacle 104 into the evacuation station 100.

Figure 6E:
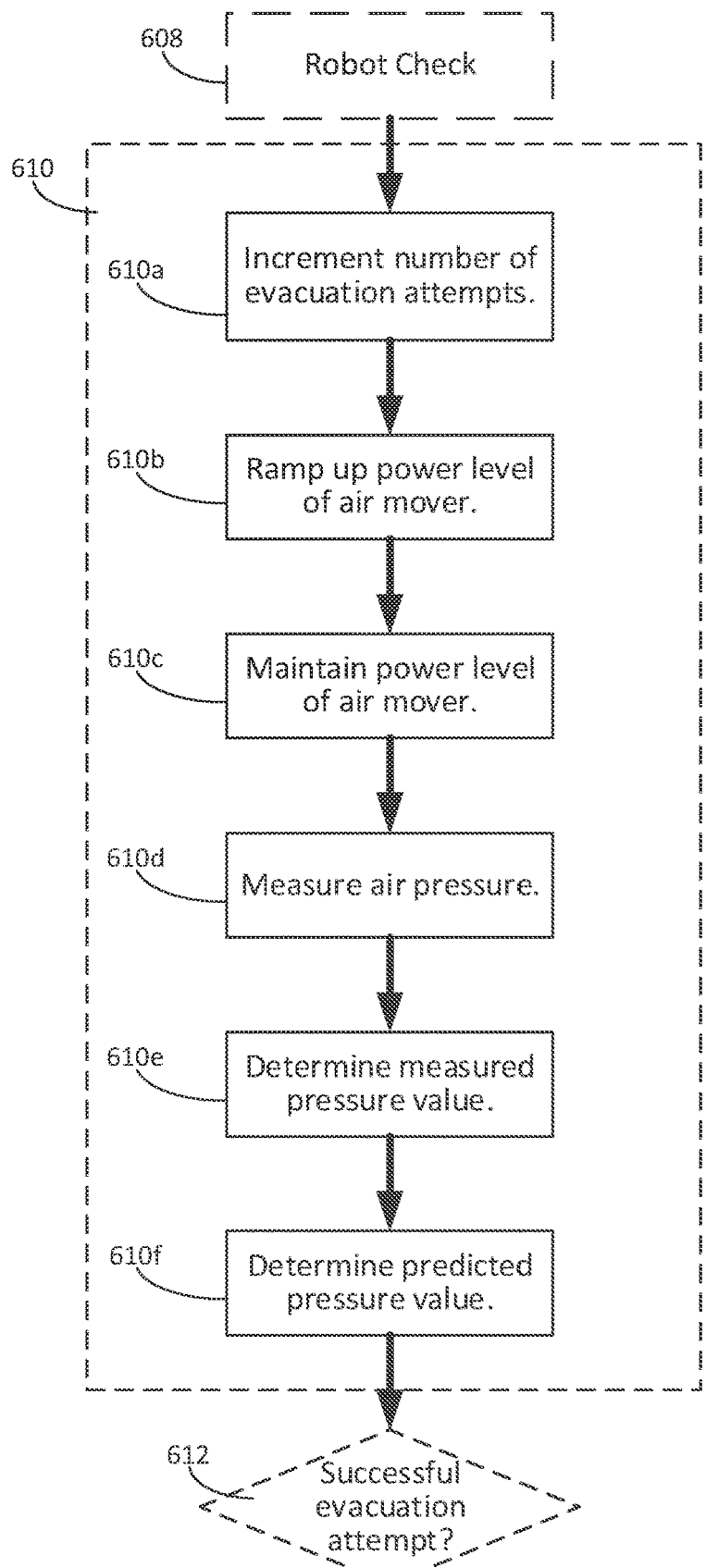

FIG. 6E illustrates an example process for the operation 610 to perform the evacuation attempt. The operation 610 can include suboperations 610a, 610b, 610c, 610d, 610e, 610f.

At the suboperation 610a, the number of evacuation attempts is incremented. As described herein, the evacuation station 100 tracks the number of evacuation attempts to limit an amount of time that the air mover 117 is activated. The number of evacuation attempts need not necessarily correspond to the number of evacuation operations counted at the suboperation 606a, as multiple evacuation attempts can be performed during a single evacuation operation. As described herein, a maximum number of evacuation attempts that can be performed during a single evacuation operation is set to limit a duration of time that the evacuation station 100 operates the air mover 117.

At the suboperation 610b, a power level of the air mover 117 is ramped up, e.g., from a power level of zero. The controller 113 increases the power level of the air mover 117 to an evacuation power level. The power level is increased over an amount of time. The amount of time can be, for example, between 3 and 10 seconds, e.g., between 3 and 7 seconds, between 5 and 10 seconds, about 5 seconds, about 7 seconds, or about 9 seconds.

At the suboperation 610c, the power level of the air mover 117 is maintained, e.g., at the power level set at the suboperation 610b. In this regard, the air mover 117 can be operating at the evacuation power level during the suboperation 610b. The power level of the air mover 117 can be operated at the evacuation power level for a duration of time. This duration of time can be, for example, between 3 and 10 seconds, e.g., between 3 and 7 seconds, between 5 and 10 seconds, about 5 seconds, about 7 seconds, or about 9 seconds.

At the suboperation 610d, an air pressure is measured. For example, the controller 113 can use the sensor 126 to generate data indicative of the air pressure in the canister 102. This air pressure can be measured while the air mover 117 is being operated at the evacuation power level. The air pressure can be measured before the power level of the air mover 117 is decreased from the evacuation power level.

At the suboperation 610e, a measured pressure value is determined. A portion of the air pressure measured at the suboperation 610d is generated from the ambient air pressure. The pressure value corresponds to a portion of the air pressure produced by the evacuation station 100. The controller 113 can determine the measured pressure value based on the ambient air pressure determined during the suboperation 606b and the air pressure in the canister 102 measured during the suboperation 610d. As described herein, the pressure value can correspond to be proportional to a difference between the ambient air pressure (measured during the suboperation 606b) and the air pressure in the canister 102 (measured during the suboperation 610d).

The measured air pressure during the suboperation 610d can be a steady-state air pressure, and thus the measured pressure value can correspond to a steady-state pressure value. FIG. 7 illustrates a set of example plots for pressure values measured during several example evacuation operations. In each of these example evacuation operations, a pressure value is measured several times over a period of time over which an evacuation operation is performed. As shown in these example plots, for most of the example evacuation operations, the pressure values reach steady-state values after a first initial portion 700 of the period of time. This first initial portion 700 of the period of time can include the period of time that the air mover 117 is being ramped up at the operation 610b. In some cases, the initial portion 700 also includes a portion of the period of time that the power level of the air mover 117 is being maintained at the suboperation 610c.

In addition, for most of the example evacuation operations, the pressure values are at steady-state values during a second portion 702 of the period of time after the first initial portion 700. The second portion 702 of the period of time includes an end portion of the period of time. The power level of the air mover 117 is typically maintained, e.g., at the operation 610c, over the second portion 702 of the period of time. In this regard, the pressure value for an evacuation operation typically can be measured during an end portion of a period of time over which the evacuation operation is performed such that the pressure value is a steady-state pressure value.

Referring back to FIG. 6E, at the suboperation 610f, a predicted pressure value is determined. In particular, a pressure value at an end of the time period in which the air mover 117 is activated, e.g., at an end of the time period including the suboperations 610c, 610d, can be predicted by the controller 113. The controller 113 can determine the predicted pressure value using a statistical model. For example, the controller 113 can use Kalman filtering to predict a pressure value for a current evacuation operation before the receptacle 104 is expected to be full. The expected number of evacuation operations that could be performed before the receptacle 104 is expected to be full can be between 10 and 100 evacuation operations, e.g., between 10 and 50 evacuation operations, 25 and 75 evacuation operations, 50 and 100 evacuation operations, about 30 evacuation operations, about 50 evacuation operations, or about 70 evacuation operations.

The controller 113 can further use Kalman filtering to determine an amount of uncertainty of a predicted pressure value. The uncertainty can correspond to a variance, a covariance, or other statistical parameter for variability for the pressure value. The controller 113 can thus generate data indicative of a predicted value for the pressure value and data indicative of an uncertainty associated with the predicted value for the pressure value. Using Kalman filtering, the controller 113 can determine the predicted pressure value and the amount of uncertainty using previously measured pressure values, e.g., measured in previous evacuation operations.

The controller 113 can be programmed to use initial conditions for the Kalman filtering algorithm. These initial conditions can correspond to data collected from evacuation stations using receptacles similar to the receptacle 104. In some implementations, the initial conditions can be modified based on data collected from other users' evacuation stations.

Turning back to FIG. 6A, at the operation 612, the evacuation station 100 determines whether the evacuation attempt performed at the suboperation 610 was successful. For example, the controller 113 of the evacuation station 100 determines a successfulness of the evacuation attempt based on the pressure value measured at the suboperation 610e. The successfulness of the evacuation attempt can further be determined based on at least one of the pressure values predicted at the suboperation 610f, the uncertainty determined at the suboperation 610f, or the number of evacuation operations as determined at the suboperation 606a.

In some examples, a range of pressure values that indicate a successful evacuation operation is set. The range of pressure values can vary depending on the index of the current evacuation operation, e.g., the number of evacuation operations as determined at the suboperation 606a. For example, the pressure value predicted at the suboperation 610f can vary depending on the index of the current evacuation operation. In some implementations, the controller 113 programmed to use a default range of pressure values for the initial evacuation operation, i.e., when the number of evacuation operations or the evacuation operation index is one. The default range of pressure values can be modified for subsequent evacuation operations based on the mathematical model described with respect to the suboperation 610f.

By way of example, if the current evacuation operation occurs after a previous evacuation operation, the pressure value predicted at the suboperation 610f is based at least in part on a pressure value measured during the previous evacuation operation. The previous evacuation operation and the current evacuation operation can be consecutive evacuation operations. In some implementations, the previous evacuation operation and the current evacuation operation are not consecutive evacuation operations. For example, at least one intervening evacuation operation is performed between the previous evacuation operation and the current evacuation operation. The pressure value predicted at the suboperation 610f for the current evacuation operation can be based at least in part by the pressure values measured in the previous evacuation operation and the at least one intervening evacuation operation.

The range of pressure values can be defined at least in part by the predicted pressure value and the uncertainty associated with the predicted pressure value. The predicted pressure value can correspond to a value within the range of pressure values, e.g., a center value of the range of pressure values. The uncertainty ($\sigma$) associated with the predicted pressure value ($P_P$) can define at least in part an upper boundary (UB) and a lower boundary (LB) for the range of pressure values. A pressure value measured at the suboperation 610e that is within the range of pressure values indicates that the evacuation operation is successful. In some implementations, the measured pressure value is no more than or is less than the upper boundary of the range and is no less than or is greater than the lower boundary of the range for the evacuation operation to be successful.

In some implementations, the upper boundary is greater than the predicted pressure value by an amount proportional to the uncertainty, and the lower boundary is lower than the predicted pressure value by an amount proportional to the uncertainty. The upper boundary can equal the sum of the predicted pressure value and a first multiple of the uncertainty (i.e., $UB=P_P+\alpha\sigma$), and the lower boundary can equal the difference between the predicted pressure value and a second multiple of the uncertainty (i.e., $UB=P_P-\beta\sigma$). A multiplier ($\alpha$) for the first multiple can be a value between 0.5 and 15, between 1 and 5, between 5 and 10, or more, e.g., 1, 2, 3, 4, 5, 6, 7, 8, 9, 10, or more, and a multiplier ($\beta$) for the second multiple can be a value between 0.5 and 15, between 1 and 5, between 5 and 10, or more, e.g., 1, 2, 3, 4, 5, 6, 7, 8, 9, 10, or more. In some implementations, the multiplier for the first multiple is equal to the multiplier for the second multiple.

If the evacuation successful is determined be successful, at the operation 614, the power level of the air mover 117 is maintained for a duration of time. This duration of time can be between 1 and 10 seconds, e.g., between 1 and 5 seconds, between 3 and 7 seconds, between 5 and 10 seconds, about 2 seconds, about 4 seconds, about 6 seconds, or about 8 seconds. In some implementations, the power level of the air mover 117 is ramped down or decreased to zero after the power level of the air mover 117 is maintained. The power level can be ramped down over a duration of time between, for example, 0.5 and 5 seconds, e.g., between 0.5 and 2 seconds, between 2 and 3 seconds, between 3 and 4 seconds, between 4 and 5 seconds, about 1 second, or about 3 seconds.

If the evacuation attempt is determined not to be successful, at the operation 616, 618, and 620, a clog detection and dislodgement, a seal detection, and a receptacle full detection are performed. While these operations are shown as occurring sequentially, in some implementations, the order of these operations can vary, or at least some of these operations can be performed simultaneously.

If the evacuation attempt is determined not to be successful, a notification to the user can be provided, e.g., in response to the measured pressure value being outside of the range of pressure values described with respect to the operation 612. The evacuation station 100 can cause a human-perceptible indication indicating that the evacuation operation failed to be provided. The evacuation station 100 can provide the notification using an indicator device of the evacuation station 100, or the evacuation station 100 can cause a mobile device to provide the notification to the user. As described herein with respect to FIGS. 6F, 6G, and 6I, the indication can include a notification that the evacuation station 100 failed to perform the evacuation operation due to an obstruction or clog in the evacuation station 100 or the robot 200, an improper seal in the evacuation station 100 or the robot 200, or the receptacle 104 in the evacuation station 100 being full.

Figure 6F:
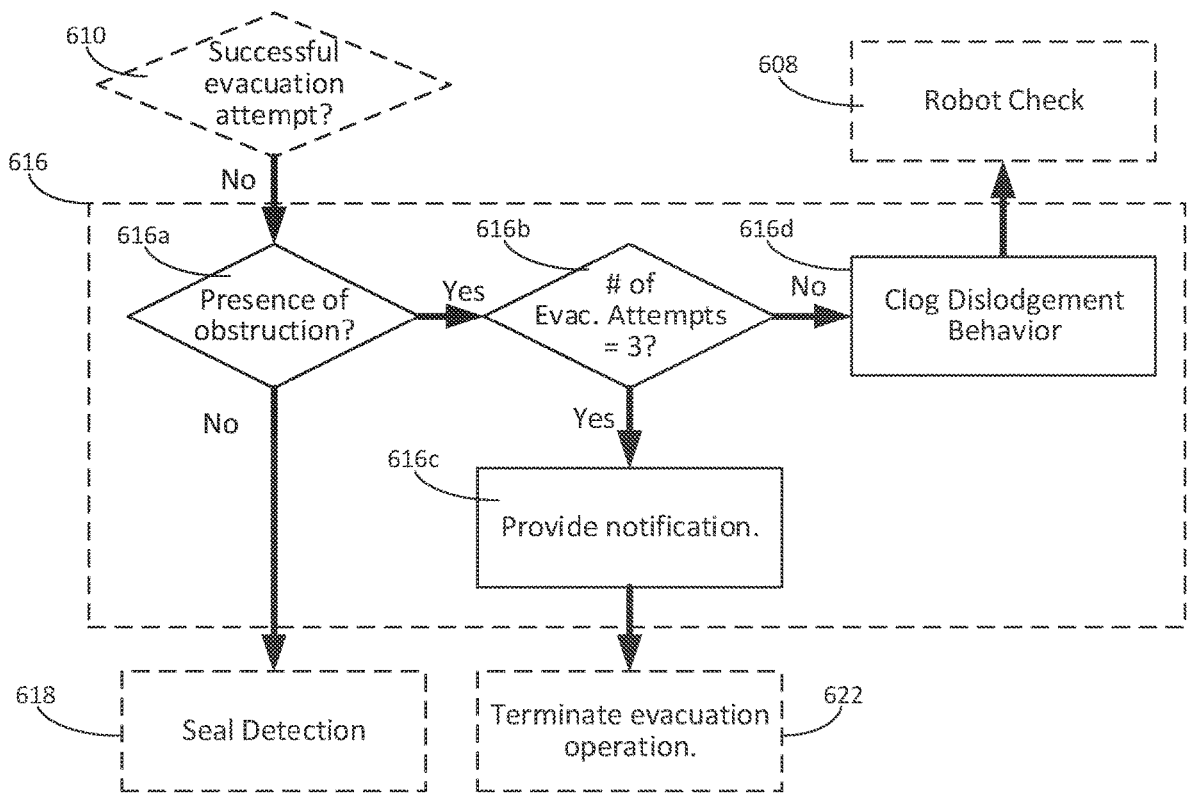

FIG. 6F illustrates an example process for the operation 616 to perform the clog detection and dislodgement. The operation 616 can include suboperations 616a, 616b, 616c, 616d. At the suboperation 616a, the evacuation station 100 determines whether an obstruction or clog may be present. The controller 113 determines whether the obstruction may be present based on the pressure value measured at the suboperation 610e. If the pressure value is outside of the range, then the evacuation station 100 determines that an obstruction may be present. For example, if the pressure value is greater than the upper boundary, then the evacuation station 100 can determine that the evacuation station 100 is in a clogged state.

If the evacuation station 100 determines that the obstruction is not present at the suboperation 616a, the process 600 proceeds to the operation 618 to perform the seal detection. If the evacuation station 100 determines that the obstruction may be present at the suboperation 616a, the evacuation station 100 at the suboperation 616b determines whether a number of evacuation attempts is equal to a limited amount. This limited amount can be equal to three, although in other implementations, the limited amount can be one, two, four, or more. This suboperation can ensure that the evacuation station 100 only runs for a limited duration of time and does not operate the air mover 117 beyond this limited duration of time.

If the number of evacuation attempts is equal to the limited amount, at the suboperation 610c, a notification is provided to the user. The evacuation station 100 can provide the notification using an indicator device of the evacuation station 100, or the evacuation station can cause a mobile device to provide the notification to the user. The notification indicates to the user that the evacuation operation was unsuccessful. In some implementations, the notification further indicates to the user that, during the evacuation operation, the evacuation station 100 attempted to but failed to dislodge an obstruction or clog. In addition to providing the notification, the evacuation station 100 can deactivate the air mover 117. For example, the process can proceed to the operation 622 in which the evacuation station 100 terminates the evacuation operation and awaits for a further evacuation operation to be triggered.

Additionally or alternatively, a notification is provided when the number of evacuation attempts is equal to the limited amount. The notification can indicate that a clog was detected and can further indicate whether the clog was dislodged at the suboperation 610d.

In some implementations, rather than or in addition to determining whether the number of evacuation attempts is equal to the limited amount at the suboperation 616b, the evacuation station 100 determines whether a total duration of the current evacuation operation is greater than a limited duration of time. This limited duration of time, as described herein, can be set to prevent the evacuation station 100 from operating in a manner that produces too much noise in the environment of the evacuation station 100. In addition, the limited duration of time can be between 10 seconds and 1 minute, e.g., 10 seconds to 45 seconds, 20 seconds to 40 seconds, or about 10 seconds, 20 seconds, 30 seconds, or more.

In some implementations, rather than terminating the evacuation operation, the controller 113 proceeds to perform the receptacle full detection at the operation 620 if the number of evacuation attempts is equal to the limited amount. As the measured pressure value is greater than the upper boundary and is indicative of a clog, the controller 113, as described herein with respect to the operation 620, can determine whether the measured pressure value is also greater than a receptacle full threshold. If the measured pressure value is also greater than the receptacle full threshold, then the controller 113 determines that the receptacle 104 of the evacuation station 100 is full and can provide an instruction to the user to replace the receptacle 104.

Figure 6G:
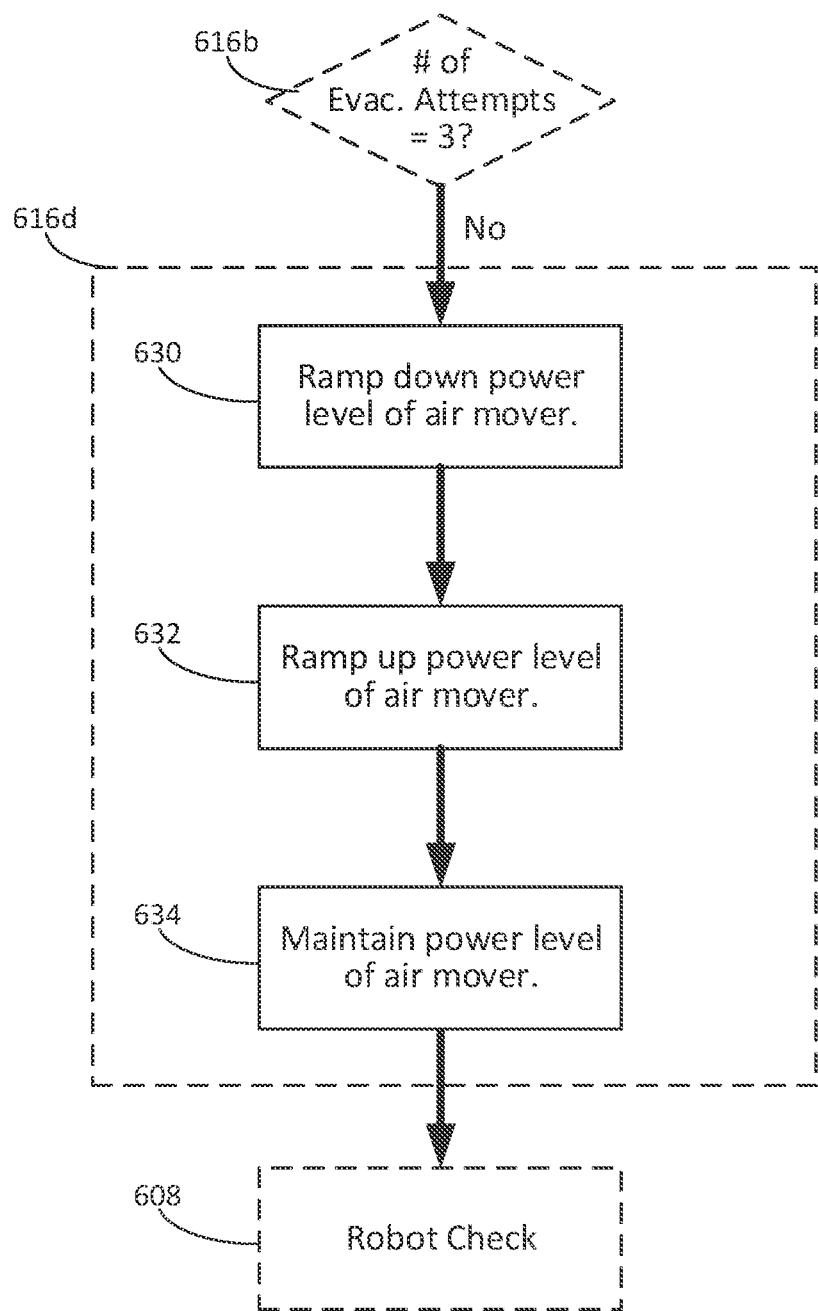

If the number of evacuation attempts is determined to be one or two at the suboperation 616b, at the suboperation 610d, a clog dislodgment behavior is performed. FIG. 6G illustrates an example process for the suboperation 616b to perform the clog dislodgement behavior. The suboperation 616b can include suboperations 630, 632, 634.

At the suboperation 630, the power level of the air mover 117 is ramped down over a duration of time. The air mover 117 can be deactivated, and the power level of the air mover 117 can be set to zero at the suboperation 630. This duration of time can be between 0.5 and 3 seconds, e.g., between 0.5 and 1.5 seconds, between 1 and 2 seconds, between 2 and 3 seconds, or about 1, 2, or 3 seconds.

At the suboperation 632, the power level of the air mover 117 is ramped up over a duration of time. The power level can be ramped up to the evacuation power level to which the power level is increased at the suboperation 610b. The duration of time for the ramping up that occurs at the suboperation 632 can be between 0.5 and 4 seconds, e.g., between 0.5 and 2 seconds, between 1 and 3 seconds, between 2 and 4 seconds, or about 1, 2, or 3 seconds. The duration of time over which the power level is ramped up at the suboperation 632 can be less than the duration of time over which the power level is ramped up at the suboperation 610b (shown in FIG. 6E) during the evacuation attempt performed at the operation 610. The evacuation station 100 can ramp up the power level over the shorter duration of time for the suboperation 632 so as to create a higher impulse force on any clog that might be present along an airflow path through the evacuation station 100 or the robot 200. This higher impulse force could have a higher likelihood of dislodging the clog. The duration of time for the suboperation 632 can be 25% to 75% of the duration of time for the suboperation 610b, e.g., 25% to 50%, 30% to 70%, 35% to 65%, or about 25%, 35%, 45%, 55%, 65%, or 75% of the duration of time for the suboperation 610b. Alternatively, the duration of time At the suboperation 634, the power level of the air mover 117 is maintained at the power level set at the suboperation 632. After the suboperation 634, the evacuation station 100 proceeds to perform the robot check at the operation 608 and the operations that follow the operation 608 as shown in FIG. 6A. In this regard, the evacuation station 100 performs another evacuation attempt, and the pressure value is measured again to determine whether the evacuation station 100 has successfully performed the evacuation operation.

Figure 6H:
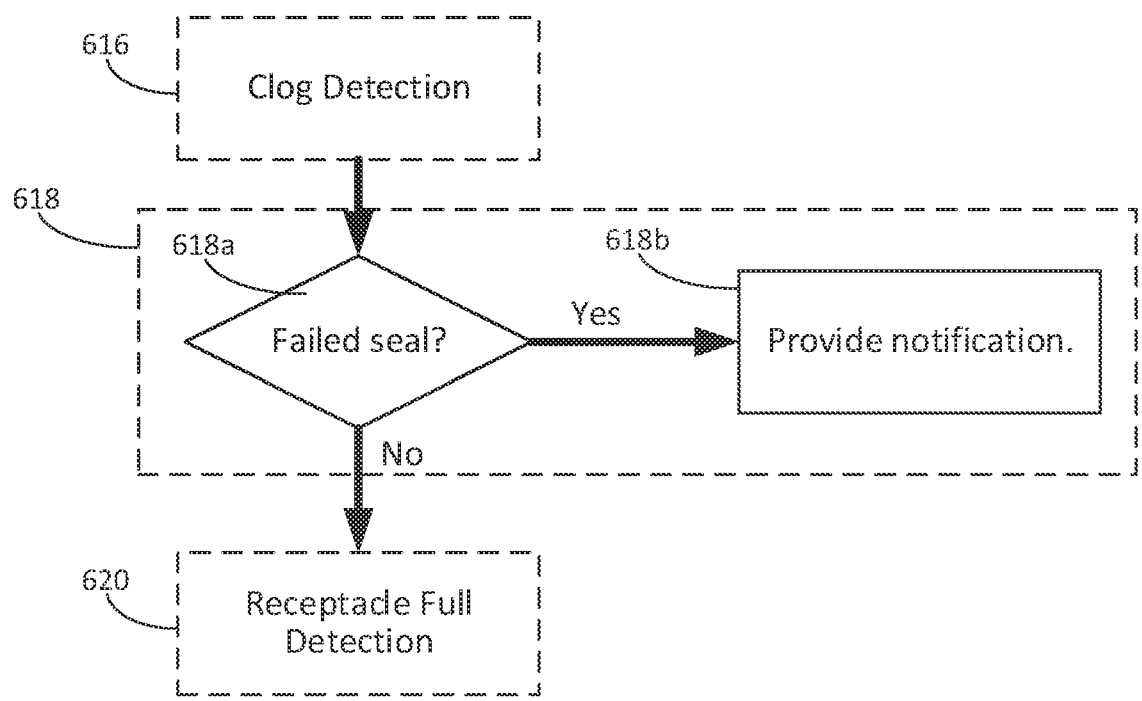

FIG. 6H illustrates an example process for the operation 618 to perform the seal detection. At the operation 618, the controller 113 determines whether a leak is present along the airflow path, e.g., due to an improper or failed seal. For example, if the robot 200 and the evacuation station 100 are not properly interfacing with one another, e.g., the outlet of the robot 200 is not aligned with the intake 118 of the evacuation station 100, parallel airflow may leak through the interface between the robot 200 and the evacuation station 100. As shown in FIG. 6H, the operation 618 can include suboperations 618a, 618b.

At the suboperation 618a, the evacuation station 100 determines whether a seal along the airflow path has failed. The controller 113 can determine that a seal has failed based on the pressure value measured at the suboperation 610e. For example, if the measured pressure value is less than the range of pressure values set at the operation 612, e.g., below or no greater than the lower boundary of the range, then the evacuation station 100 determines that the seal has failed. If the evacuation station 100 determines that the seal along the airflow path has failed, at the suboperation 618b, a notification is provided to the user indicating that the seal has failed. The evacuation station 100 can provide the notification using an indicator device of the evacuation station 100, or the evacuation station can cause a mobile device to provide the notification to the user.

Figure 6I:
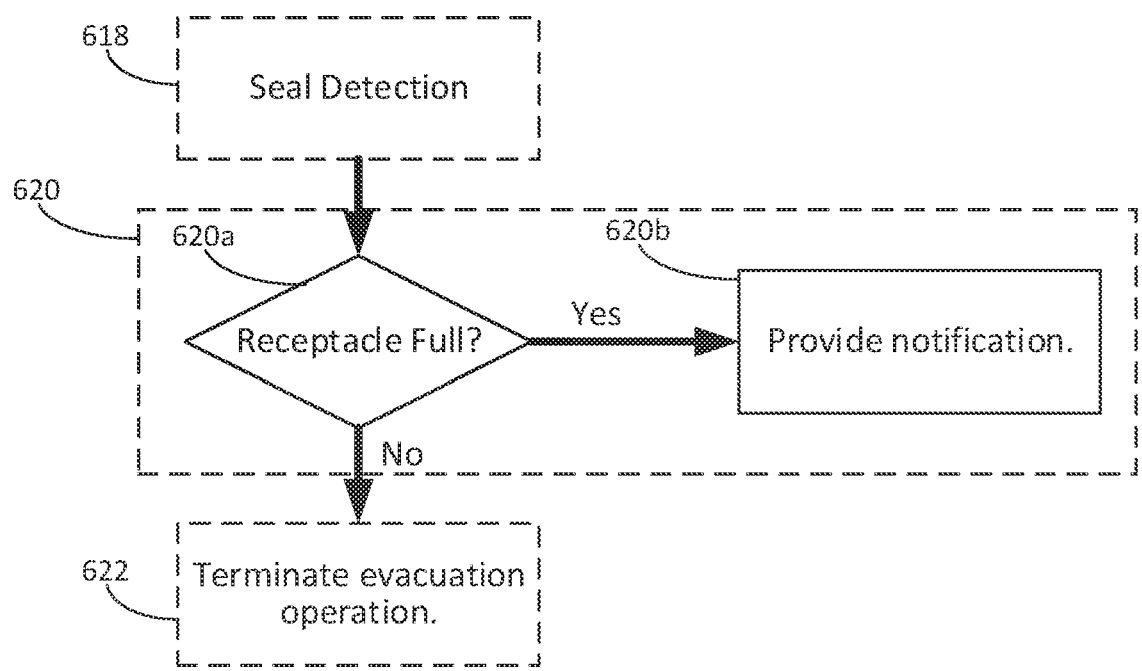

If the evacuation station 100 determines that the seal along the airflow path has not failed, the process 600 proceeds with the operation 620 in which the evacuation station 100 determines whether the receptacle 104 of the evacuation station 100 is full. FIG. 6I illustrates an example process for the operation 620 to perform the receptacle full detection. The operation 620 includes suboperations 620a, 620b.

At the suboperation 620a, the evacuation station 100 determines whether the receptacle 104 of the evacuation station 100 is full. Conditions for determining that the receptacle 104 is full can vary in implementations.

In some implementations, the controller 113 can determine that the receptacle 104 of the evacuation station 100 is full based on the pressure value measured at the suboperation 610e. For example, if the pressure value measured at the suboperation 610e is greater than a bag full threshold pressure value ($P_{FULL}$), then the controller 113 can determine that the receptacle 104 is full. The bag full threshold pressure value can be equal the sum of the predicted pressure value and a multiple of the uncertainty determined at the suboperation 610f (i.e., $P_{FULL}=P_P+\gamma\sigma$). A multiplier ($\gamma$) for the multiple is 1.5 to 10 times greater than, e.g., 1.5 to 3 times, 2 to 4 times, 3 to 5 times, or 5 to 10 times greater than, the multiplier (a) for the first multiple described with respect to the upper boundary of the range of pressure values for a successful evacuation attempt. The multiplier ($\gamma$) can be a value between 5 and 30, e.g., between 5 and 15, between 10 and 20, between 15 and 25, between 20 and 30, or about 10, 15, or 20. In implementations in which the controller 113 determines that the receptacle 104 is full based on the pressure value alone, the controller 113 can perform the operation 620 after the controller 113 determines that the pressure value is indicative of a clog and thus exceeds a threshold value less than the receptacle full threshold pressure value.

In some implementations, the controller 113 can determine that the receptacle 104 is full in response to a total duration of time that has elapsed during the current evacuation operation. For example, the total duration of time that has elapsed can be no less than the limited duration of time as described with respect to the suboperation 616b. In some implementations, this limited duration of time is selected such that only a limited number of evacuation attempts are performed. This limited number of evacuation attempts can correspond to the limited number described with respect to the suboperation 616b. In some implementations, the controller 113 can determine that the receptacle 104 is full in response to a total number of evacuation attempts reaching the limited number of evacuation attempts.

In some implementations, the controller 113 determines that the receptacle 104 is full in response to a total number of consecutive evacuation operations in which the controller 113 determines that an obstruction or clog is present exceeding a limited amount. For example, the limited amount can be equal to 1, 2, 3, or more. In some implementations, the controller 113 determines that the receptacle 104 is full only if (i) the pressure value exceeds the receptacle full threshold pressure value and (ii) the total number of consecutive evacuation operations in which an obstruction or clog is present exceeds the limited amount.

If the evacuation station 100 determines that the receptacle 104 is full, at the suboperation 620b, a notification is provided to the user indicating that the receptacle 104 is full. A notification indicating that the receptacle 104 should be replaced can also be provided. The evacuation station 100 can provide a notification using an indicator device of the evacuation station 100, or the evacuation station 100 can cause a mobile device to provide the notification to the user. If the evacuation station 100 determines that the receptacle 104 is not full, the evacuation station 100 terminates the evacuation operation at the operation 622 and awaits for a further evacuation operation to be triggered.

Additional Alternative Implementations

A number of implementations, including alternative implementations, have been described. Nevertheless, it will be understood that further alternative implementations are possible, and that various modifications may be made.

Figure 8:
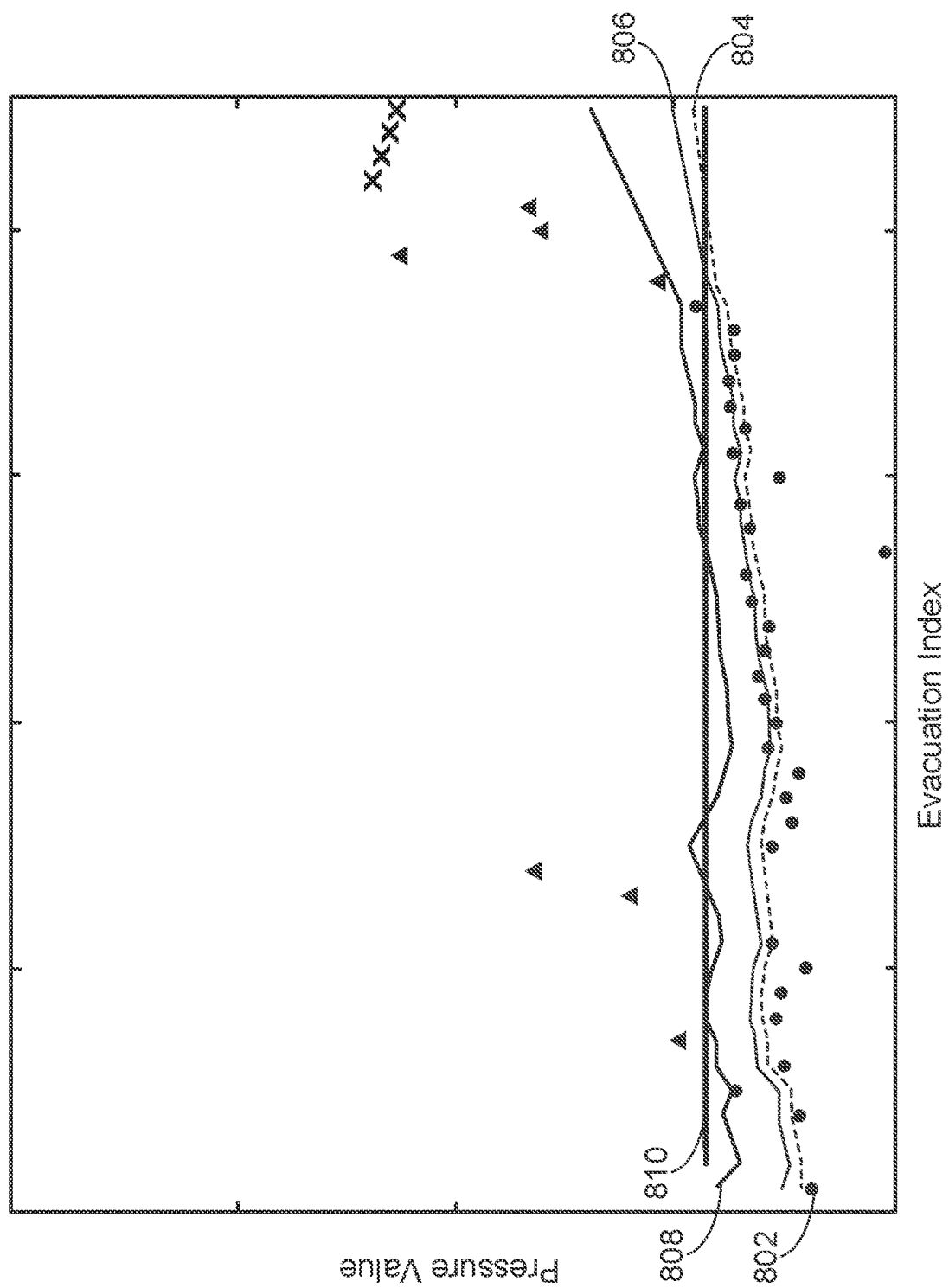

FIG. 8 illustrates a diagram of pressure values measured for a series of evacuation operations performed by an evacuation station. In the example of FIG. 8, measured pressure values 802, predicted pressure values 804, values 806 indicative of an uncertainty associated with the predicted pressure values 804, and upper boundaries 808 for ranges of pressure values indicative of successful evacuation attempts are shown. In FIG. 8, the measured pressure values 802 denoted by circles, triangles, and crosses correspond to successful evacuation operations, evacuation operations in which a clog was detected, and evacuation operations in which the receptacle was determined to be full, respectively. While FIG. 8 does not show a lower boundary for the range of pressure values indicative of a successful evacuation operation, as described herein in certain implementations, an evacuation station can determine that a seal has failed in response to a measured pressure value being below the lower boundary.

As shown in FIG. 8, the values 802, 804, 806 and the upper boundaries 808 vary across evacuation operations. For each evacuation operation, the measured pressure value 802 can be measured in accordance with the processes and operations described with respect to the suboperation 610e. The predicted pressure value 804 can be determined in accordance with the processes and operations described with respect to the suboperation 610f. The value 806, in the example shown in FIG. 8, corresponds to a sum of the predicted pressure value and the uncertainty. The uncertainty for the predicted pressure value can be determined in accordance with the processes and operations described with respect to the suboperation 610f. The upper boundary 808 can be determined in accordance with the processes and operations described with respect to the operation 612. For an evacuation operation, the upper boundary 808 can increase or decrease relative to the upper boundary 808 for the last evacuation operation depending on the measured pressure value 802 for the last evacuation operation. As described with respect to the operation 616, the evacuation station determines that an obstruction or clog is present in response to the measured pressure value 802 being no less than or being greater than the upper boundary 808.

The diagram in FIG. 8 further shows a threshold pressure value 810 above which a receptacle of the evacuation station is determined to be full. While in certain examples described herein, the receptacle is determined to be full based on a measured pressure value, in some implementations, the receptacle is determined to be full based on a predicted pressure value 804. In the example illustrated in FIG. 8, the evacuation station determines that the receptacle is full in response to the predicted pressure value 804 being above the threshold pressure value 810. The threshold pressure value 810 can be uniform across evacuation operations, even though the upper boundary 808 can vary between evacuation operations.

The threshold pressure value 810 can be selected such that, typically, the evacuation station determines that a clog is present in several evacuation operations immediately preceding the predicted pressure value 804 broaching the threshold pressure value 810. In the example shown in FIG. 8, the evacuation station performed four consecutive evacuation operations in which a clog was detected before the predicted pressure value 804 broached the threshold pressure value 810. In some implementations, this number of consecutive evacuation operations in which a clog was detected can be fewer or more, e.g., 2, 3, 5, 6, or more.

Figure 9:
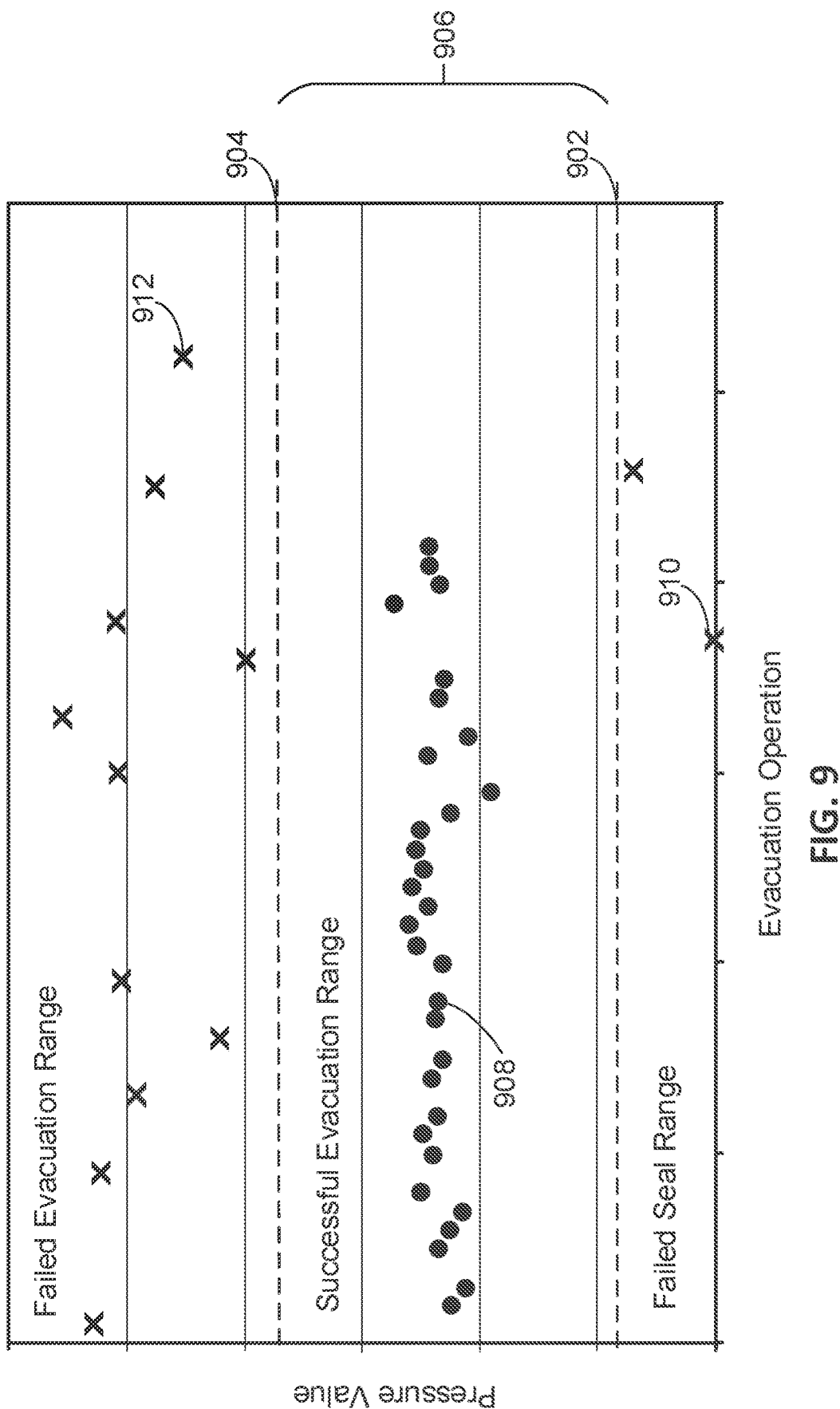

While in certain implementations upper and lower boundaries of a range of pressure values indicative of a successful evacuation operation may vary between evacuation operations, in certain implementations, the upper and lower boundaries can be static. For example, FIG. 9 illustrates a diagram in which a lower boundary 902 and an upper boundary 904 for a range 906 of pressure values indicative of a successful evacuation operation are static across evacuation operations. Evacuation operations in which measured pressure values 908 are within the range 906 are determined to be successful evacuation operations. Evacuation operations in which the measured pressure values 908 are below the lower boundary 902 are determined to be failed evacuation operations 910. In these failed evacuation operations 910, the evacuation station determines that a seal failed. Evacuation operations in which the measured pressure values 908 are above the upper boundary 904 are determined to be failed evacuation operations 912. In these failed evacuation operations 912, the evacuation station determines that a clog is present.

As described herein, in certain implementations, the lower and upper boundaries 902, 904 are variable. In such implementations, the lower boundary 902 and the upper boundary 904 may change between evacuation operations.

Figure 10:
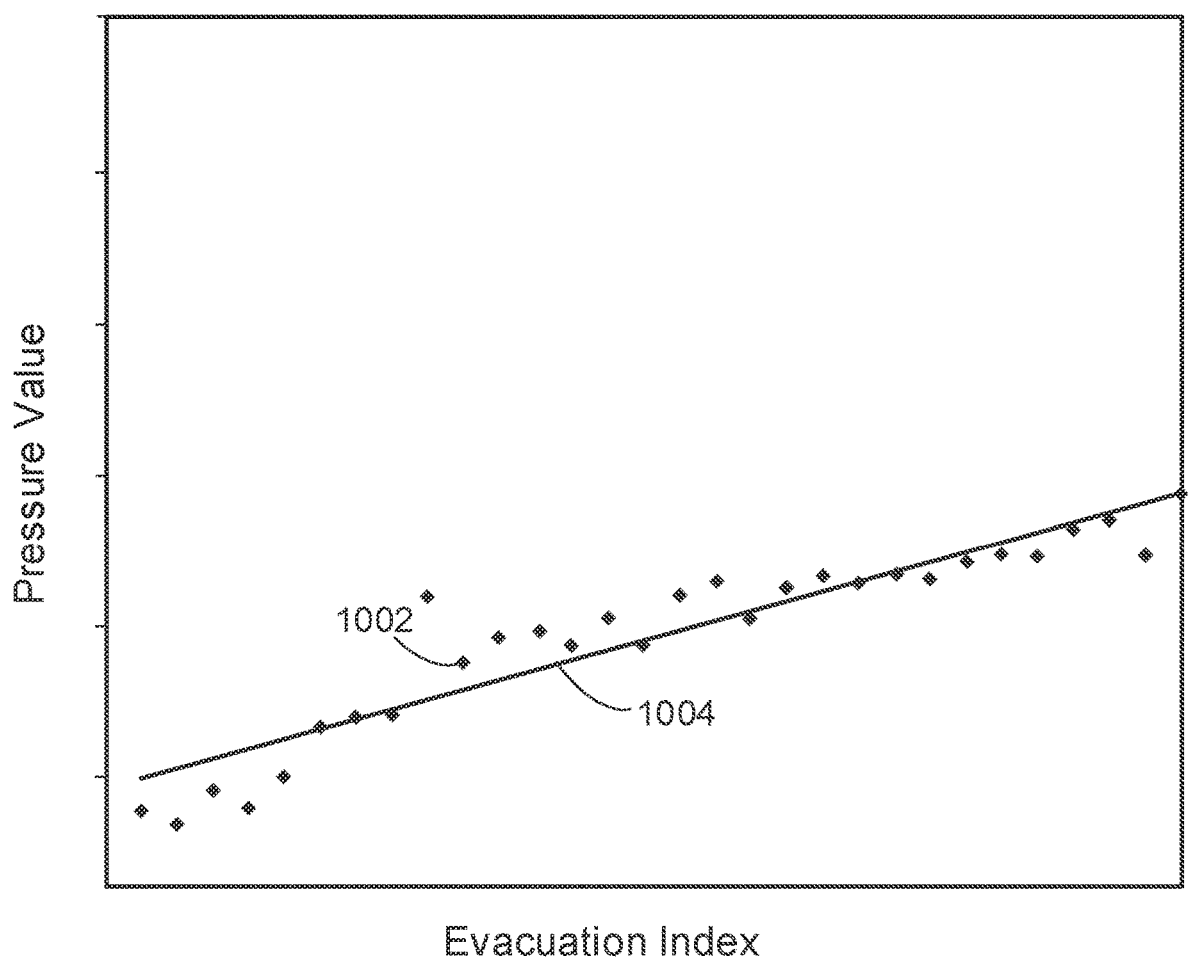

As described herein, the measured pressure value may increase as the number of evacuation operations performed by an evacuation station for a single receptacle increases. FIG. 10 illustrates measured pressure values 1002 measured across a series of evacuation operations for a single receptacle. The measured pressure values 1002 generally increase as the number of evacuation operations increases. In the example shown in FIG. 10, the measured pressure values 1002 tend to linearly increase along a trend line 1004. When the receptacle is full, the measured pressure values tend to deviate from the linear trend line 1004. In some implementations (not depicted in FIG. 10), the measured pressure values exponentially increase when the receptacle is full.

Figure 11A:
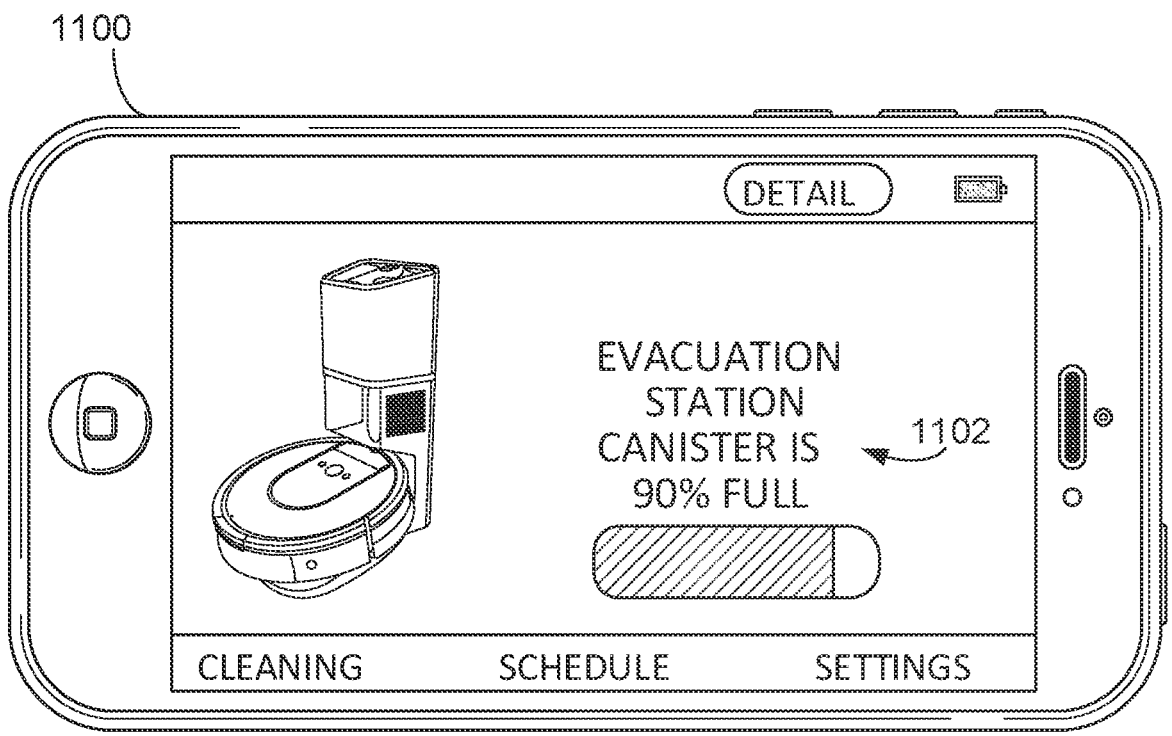
FIGS. 11A-11F are front views of remote computing devices presenting user notifications.

Notifications can be provided to the user in certain implementations. Referring to FIG. 11A, the controller 113 can transmit data indicative of the steady-state pressure value to a remote computing device 1100, e.g., a smartphone, a personal computer, a smartwatch, smartglasses, augmented reality device, or other remote computing device. For example, the controller 113 can directly transmit the data to the remote computing device 1100, e.g., via a Bluetooth, LAN, or other appropriate wireless communication protocol, or the controller 113 can transmit the data to the remote computing device 1100 via a remote server. As shown in FIG. 11A, the steady-state pressure value described herein can be indicative of a fullness state of the evacuation station 100. In some implementations, the predicted pressure value can be indicative of a fullness state of the evacuation station 100. Based on the steady-state pressure value, the remote computing device 1100 can present a notification 1102 indicative of the fullness state of the evacuation station 100. For example, the notification 1102 can indicate a percentage of the total debris capacity of the receptacle 104 occupied by accumulated debris.

Figure 11B:
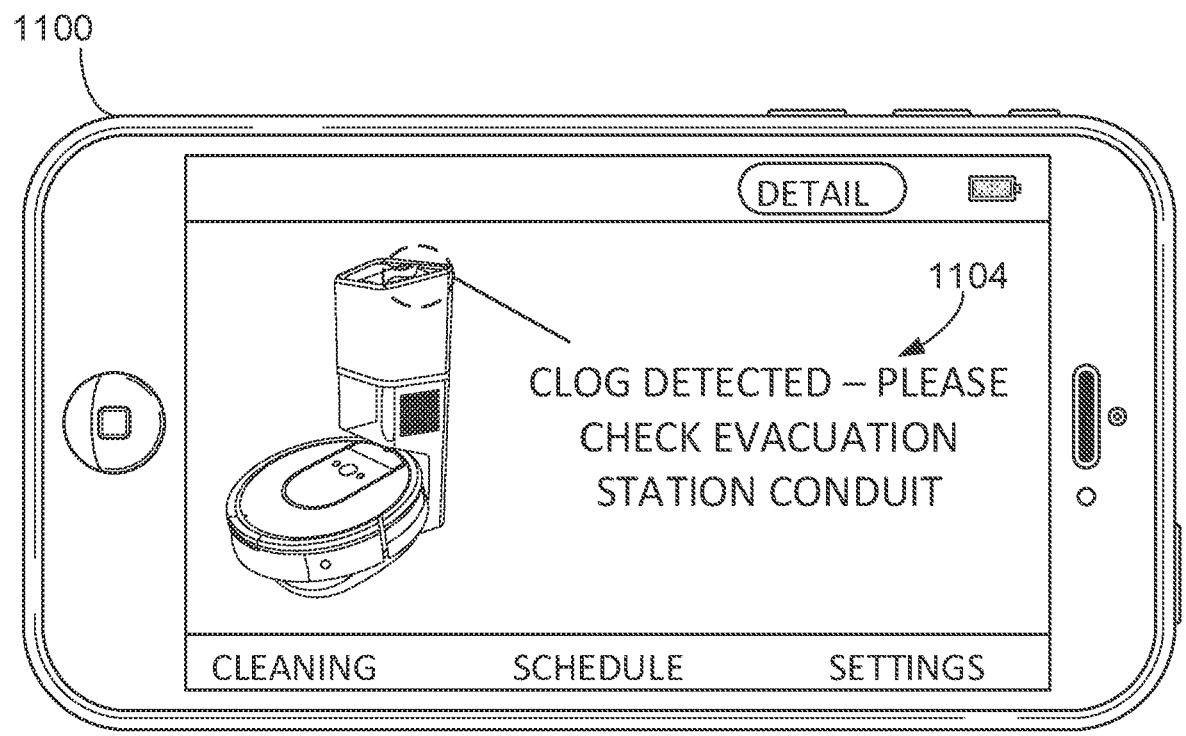

Referring to FIG. 11B, if the controller 113 determines that a clog or other obstruction is present, e.g., at the operation 616, the controller 113 can transmit data indicative of the presence of this clog or other obstruction to the remote computing device 1100, and the remote computing device 1100 can present a notification 1104 indicative of the presence of this clog or other obstruction. The notification 1104 can include an instruction for the user to check the one or more conduits of the evacuation station 100 to remove the clog or other obstruction.

Figure 11C:
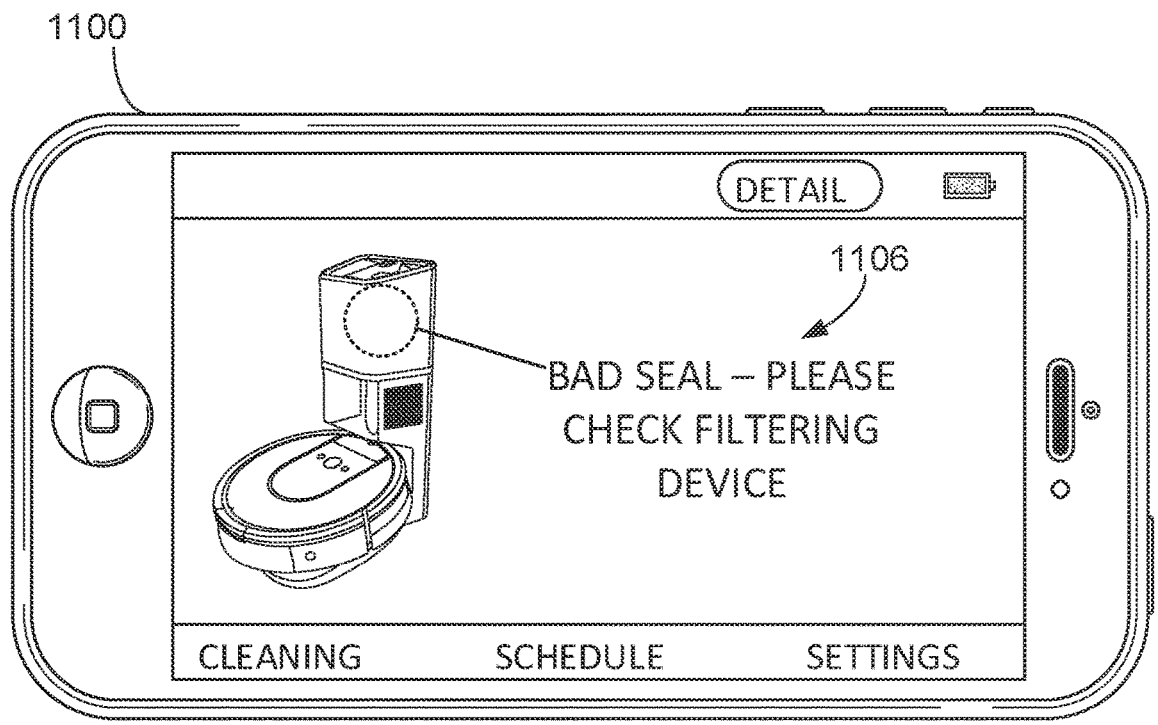

Referring to FIG. 11C, if the controller 113 determines that a seal has failed, e.g., at the operation 618, the controller 113 can transmit data indicative of the improper sealed engagement to the remote computing device 1100, and the remote computing device 1100 can present a notification 1106 indicative of the improper sealed engagement. The notification 1106 can include an instruction to the user to check the receptacle 104 and ensure that the receptacle 104 is properly seated within the interior 130 of the evacuation station 100. The notification 1106 can alternatively or additionally include an instruction to check the cover 128 of the evacuation station 100 to ensure that the cover 128 is fully closed.

Figure 11D:
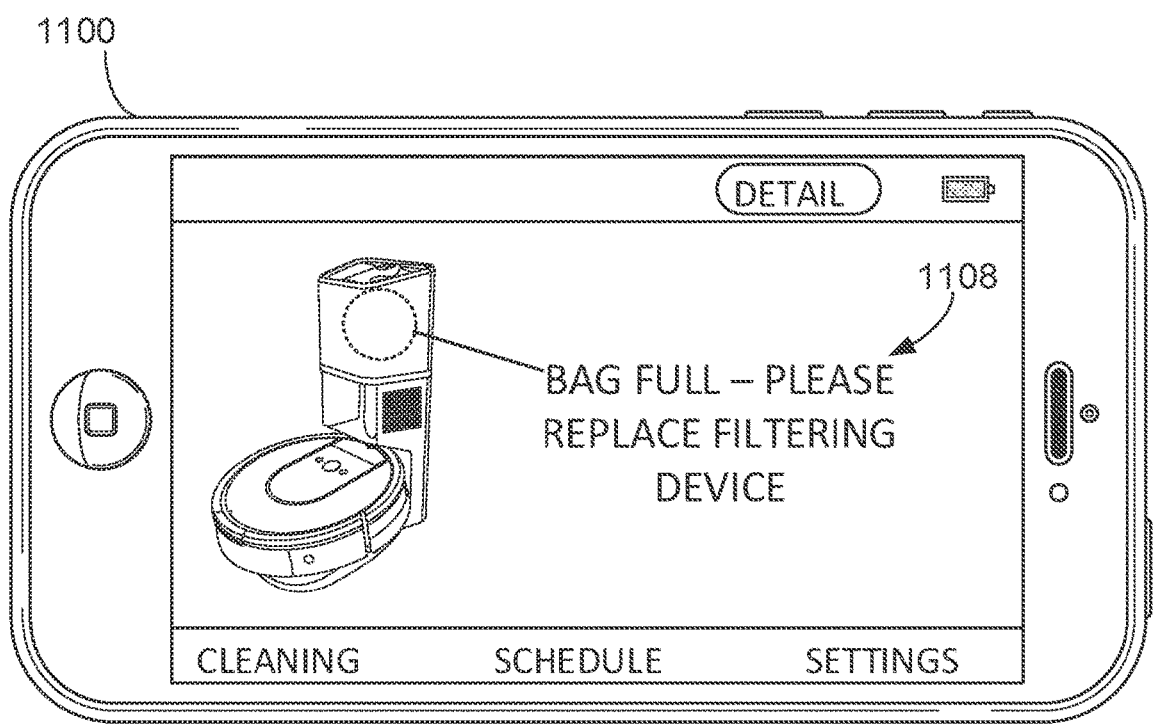
Figure 11E:
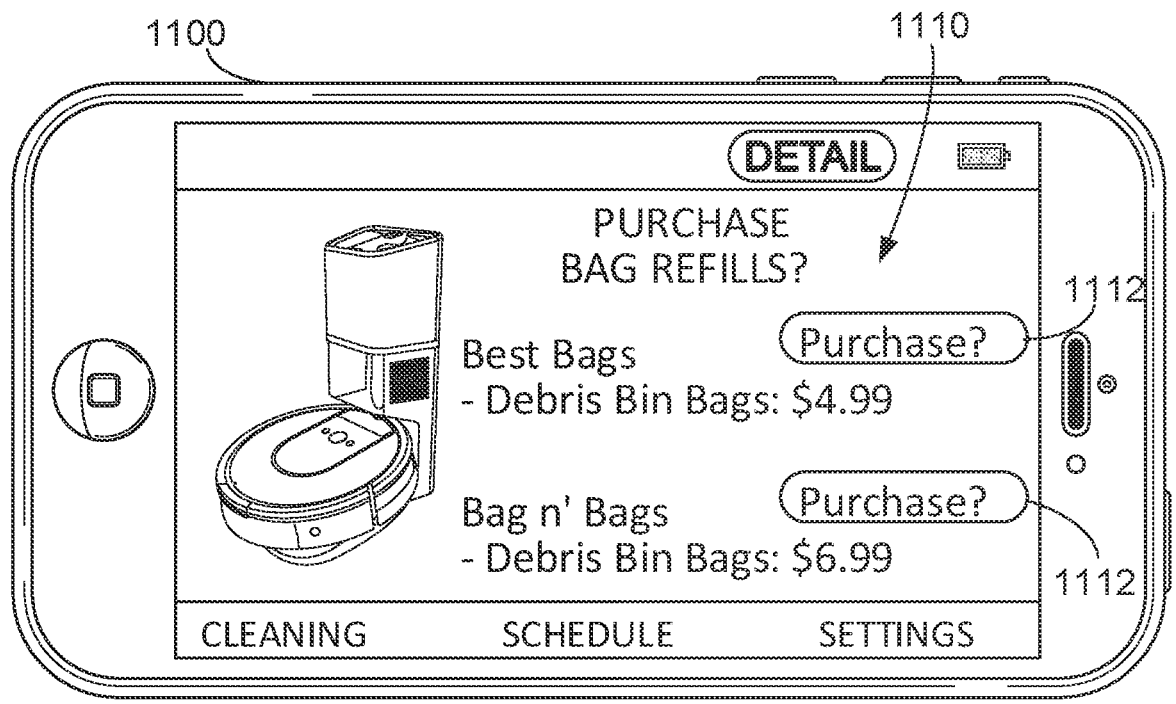

Referring to FIG. 11D, if the controller 113 determines that the receptacle 104 is full, the controller 113 can transmit data indicative of the fullness state of the receptacle 104 to the remote computing device 1100, and the remote computing device 1100 can present a notification 1108 indicating that the user should check the receptacle 104 and remove the receptacle 104 from the evacuation station 100. In some examples, referring to FIG. 11E, the controller 113 additionally or alternatively can present a notification 1110 indicating that the user should order one or more additional filtering devices. The notification 1110 can include user interface elements 1112 enabling the user to directly order a filtering device to be delivered to the user's home.

Figure 11F:
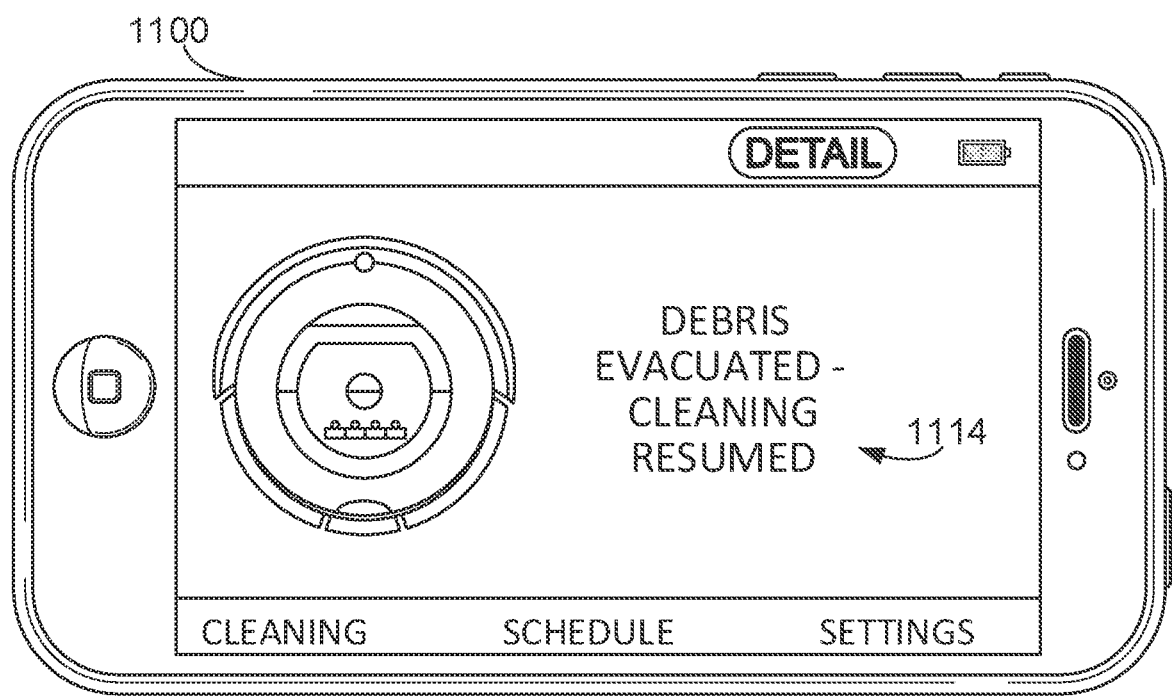

Referring to FIG. 11F, the controller 113 can transmit data indicative of the termination of the evacuation process to the remote computing device 1100, and the remote computing device 1100 can present a notification 1114 indicating that the evacuation process is complete. In some implementations, if the robot 200 continues to clean the room after the evacuation process is complete, the notification 1114 further indicates the robot 100 has resumed cleaning. While FIGS. 11A-11F show examples of a remote computing device 1100 presenting a visual notification indicative of status or conditions of the evacuation station 100 or the robot 200, in other implementations, the remote computing device 1100 can present audible, tactile, or other types of notifications.

While the operations 616, 618, 620 are described herein as part of the process 600, in some implementations, a notification is only provided to indicate the evacuation operation was unsuccessful. The notification does not indicate whether the failure of the evacuation operation was due to a clog or due to an improper seal. In such implementations, the measured pressure value is determined to be outside of the range of pressure values indicative of successfulness, and a general notification is issued informing the user that the evacuation operation failed.

The robots and evacuation stations described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations and processes associated with controlling the robots and evacuation stations described herein can be performed by one or more programmable processors executing one or more computer programs to perform the functions described herein. A computer program can be written in any form of programming language, including compiled or interpreted languages, and it can be deployed in any form, including as a stand-alone program or as a module, component, subroutine, or other unit suitable for use in a computing environment. Control over all or part of the robots and the evacuation stations described herein can be implemented using special purpose logic circuitry, e.g., an FPGA (field programmable gate array) and/or an ASIC (application-specific integrated circuit).

The controllers (e.g., the controller 113, the controller 206) described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks. While the controller 113 of the evacuation station 100 is described as controlling the air mover 117 and performing other operations as described herein, in other implementations, the controller 206 of the robot 200, a remote server, or a combination of various controllers described herein can be used to control the operations of the evacuation station 100.

While the sensor 126 is described, in some implementations, the evacuation station 100 includes multiple sensors positioned along or proximate the airflow pathways of the evacuation station 100. For example, the evacuation station 100 can include two pressure sensors, with one pressure sensor located on opposing sides of an airflow pathway. In some implementations, a first pressure sensor can be located within the canister, such as near the filtering device 103, and a second pressure sensor can be located near the intake 118 of the evacuation station 100. Based on signals from the multiple sensors, the controller 113 can determine a particular location along the airflow pathways of a clog or other obstruction or an air leak.

While the sensor 126 is described as an air pressure sensor, in other implementations, the sensor 126 is an optical sensor, a force sensor, or other sensor that can generate data indicative of an air pressure of the evacuation station 100, and hence can generate one or more signals indicative of a fullness state of the filtering device 103. For example, in some implementations, the sensor 126 is in physical contact with the filtering device 103. The sensor 126 can include a plunger in physical contact with a wall of the filtering device 103, e.g., with the filter bag 106. The plunger can move in response to expansion of the filter bag 106 as the receptacle 104 receives debris from an autonomous cleaning robot. In some implementations, the sensor 126 is an ultrasonic sensor configured to emit ultrasonic signals directed toward the filtering device 103, and receive reflections of the ultrasonic signals. The sensor 126 is configured to general electrical signals indicative of a distance of the filtering device 103 relative to the sensor 126. In particular, the received reflections ultrasonic signals can be indicative of the distance of the filtering device 103 relative to the sensor 126, which in turn can be indicative of a fullness state of the filtering device 103.

A user device is described herein in connection with certain systems and processes. The user device can vary in implementations. For example, a user device can include a mobile device (e.g., a smartphone, smartwatch, smart glasses, a tablet, or other mobile user device), a desktop computer, a laptop computer, or other user device. In addition, a user interface for the evacuation station 100 is described herein in connection with certain systems and processes. The user interface can vary in implementations. In some implementations, the user interface can correspond to a mobile device in communication with the evacuation station 100, e.g., directly in communication with the evacuation station 100 or in communication with a remote server that in turn is in communication with the evacuation station 100. In some implementations, the user interface can include a touchscreen, a button, a knob, or other user input devices on the evacuation station 100.

Accordingly, other implementations are within the scope of the claims.

What is claimed is:

1. An evacuation station for collecting debris from a cleaning robot, the evacuation station comprising:
   an intake configured to interface with the cleaning robot;
   a canister including a receptacle in pneumatic communication with the intake via an airflow path;
   a cover along the canister to moveably cover an interior of the evacuation station;
   an air mover in pneumatic communication with the canister, the air mover configured to draw air from the canister into the air mover during an evacuation operation;
   a sensor configured to sense an air pressure in the canister; and
   a controller configured to:
      initiate an evacuation operation by controlling the air mover to draw air containing debris from the cleaning robot through the intake and the airflow path such that the receptacle receives at least a portion of the debris drawn;
      determine a measured pressure value in the canister using the air pressure sensed during the evacuation operation;
      detect a sealing anomaly within the evacuation station based on the measured pressure value; and
      generating an indication of the detected sealing anomaly.

2. The evacuation station of claim 1, wherein the sealing anomaly includes the cover being open and uncovering the interior of the evacuation station during the evacuation operation, and the controller is configured to generate an indication of the cover being open during the evacuation operation.

3. The evacuation station of claim 1, wherein the sealing anomaly includes an improper seating of the receptacle within the interior of the evacuation station, and the controller is configured to generate an indication of the improper seating of the receptacle.

4. The evacuation station of claim 1, further comprising an indicator device configured to provide a notification of the detected sealing anomaly to a user.

5. The evacuation station of claim 1, communicatively coupled to a mobile device configured to provide a notification of the detected sealing anomaly to a user.

6. The evacuation station of claim 1, wherein:
   the sensor is configured to sense an ambient air pressure in the evacuation station when the air mover is inactive; and
   the controller is configured to determine the measured pressure value based on a difference between the air pressure sensed during the evacuation operation and the ambient air pressure.

7. The evacuation station of claim 1, wherein the controller is configured to detect the sealing anomaly based on a comparison of the measured pressure value and a pressure range between a upper bound and a lower bound.

8. The evacuation station of claim 7, wherein the controller is configured to detect a presence of the sealing anomaly in response to the measured pressure value being below or no greater than the lower bound of the pressure range.

9. The evacuation station of claim 8, wherein the controller is configured to generate an indication of the evacuation operation being successful in response to the measured pressure value being within the pressure range.

10. The evacuation station of claim 7, wherein the controller is configured to determine the pressure range based at least on an accumulated number of evacuation operations initiated before the evacuation operation.

11. The evacuation station of claim 7, wherein the controller is configured to:
determine a predicted air pressure value in the canister based on one or more air pressure values in the canister respectively sensed by the sensor during one or more previous evacuation operations before the evacuation operation; and
determine the pressure range based at least on the predicted air pressure value.

12. The evacuation station of claim 11, wherein the controller is configured to:
determine an uncertainty of the one or more air pressure values sensed during the one or more previous evacuation operations; and
determine the predicted air pressure value further using the determined uncertainty.

13. The evacuation station of claim 12, wherein the controller is configured to:
determine the upper bound the pressure range to be greater than the predicted air pressure value by a first amount proportional to the uncertainty; and
determine the lower bound of the pressure range to be less than the predicted air pressure value by a second amount proportional to the uncertainty.

14. A method of operating an evacuation station to collect debris from a cleaning robot interfacing with the evacuation station, the method comprising:
initiating an evacuation operation using an air mover, the evacuation operation including drawing air containing debris from the cleaning robot into a canister of the evacuation station through an airflow path;
sensing an air pressure in the canister using a sensor during the evacuation operation;
determining a measured pressure value in the canister based on the sensed air pressure;
detecting a sealing anomaly within the evacuation station based on the measured pressure value; and
generating an indication of the detected sealing anomaly to a user.

15. The method of claim 14, wherein the sealing anomaly includes one or more of an improper sealing between the evacuation station and the cleaning robot; a cover of the evacuation station being open and uncovering an interior of the evacuation station during the evacuation operation, or an improper seating of a receptacle within the interior of the evacuation station.

16. The method of claim 14, further comprising providing a notification of the detected sealing anomaly to a user via an indicator device of the evacuation station or a mobile device in communication with the evacuation station.

17. The method of claim 14, comprising sensing an ambient air pressure in the evacuation station, wherein determining the measured pressure value is based on a difference between the air pressure sensed during the evacuation operation and the ambient air pressure.

18. The method of claim 14, wherein detecting the sealing anomaly includes:
comparing the measured pressure value to a pressure range between a upper bound and a lower bound; and
determining a presence of the sealing anomaly in response to the measured pressure value being below or no greater than the lower bound of the pressure range.

19. The method of claim 18, comprising determining the pressure range based at least on an accumulated number of evacuation operations initiated before the evacuation operation.

20. The method of claim 18, comprising:
generating a predicted air pressure value in the canister based on one or more air pressure values in the canister sensed by the sensor during respective one or more previous evacuation operations before the evacuation operation; and
determining the pressure range based at least on the predicted air pressure value.

* * * * *